US012680437B2

(12) United States Patent
Warren et al.

(10) Patent No.: US 12,680,437 B2
(45) Date of Patent: Jul. 14, 2026

(54) MULTI-WELL BLENDING SYSTEM

(71) Applicant: Halliburton Energy Services, Inc., Houston, TX (US)

(72) Inventors: Wesley John Warren, Duncan, OK (US); Chad A. Fisher, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 19/085,141

(22) Filed: Mar. 20, 2025

(65) Prior Publication Data

US 2025/0320798 A1 Oct. 16, 2025

Related U.S. Application Data

(63) Continuation of application No. 18/632,640, filed on Apr. 11, 2024, now Pat. No. 12,281,557.

(51) Int. Cl.

| | |
|---|---|
| ***E21B 43/26*** | (2006.01) |
| ***B01F 23/50*** | (2022.01) |
| ***B01F 35/71*** | (2022.01) |
| ***B01F 101/49*** | (2022.01) |
| ***E21B 43/267*** | (2006.01) |

(52) U.S. Cl.
CPC .......... *E21B 43/2607* (2020.05); *B01F 23/59* (2022.01); *B01F 35/7176* (2022.01); *E21B 43/267* (2013.01); *B01F 2101/49* (2022.01)

(58) Field of Classification Search
CPC .... E21B 43/2607; E21B 43/267; B01F 23/59; B01F 35/7176; B01F 2101/49
See application file for complete search history.

(56) References Cited

U.S. PATENT DOCUMENTS 11,506,032 B1 * 11/2022 Fisher ................ E21B 43/2607
12,281,557 B1 4/2025 Warren et al.

* cited by examiner

*Primary Examiner* — James G Sayre
(74) *Attorney, Agent, or Firm* — Conley Rose, P.C.; Rodney B. Carroll

(57) ABSTRACT

A blending unit is provided. The blending unit comprises two or more discharge pumps. Each of the two or more discharge pumps has a suction inlet fluidly connected to a common proppant fluid supply via a concentrated proppant inlet line, and a discharge outlet fluidly connected to a blender outlet line. Each of the two or more discharge pumps also has an injection port upstream of the discharge pump and configured to inject substantially proppant-free fluid into the concentrated proppant inlet line, an injection port downstream from the discharge pump and configured to inject substantially proppant-free fluid into the blender outlet line, or both the injection port upstream of the discharge pump and the injection port downstream from the discharge pump.

23 Claims, 15 Drawing Sheets

MULTI-WELL BLENDING SYSTEM

CROSS-REFERENCE TO RELATED APPLICATIONS

The present application is a continuation of and claims priority to U.S. patent application Ser. No. 18/632,640 filed Apr. 11, 2024 and entitled "Multi-Well Blending System," which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Subterranean hydraulic fracturing is conducted to increase or "stimulate" production from a hydrocarbon well. To conduct a fracturing process, high pressure is used to pump special fracturing fluids, including some that contain propping agents ("proppants") down-hole and into a hydrocarbon formation to split or "fracture" the rock formation along veins or planes extending from the well-bore. Once the desired fracture is formed, the fluid flow is reversed and the liquid portion of the fracturing fluid is removed. The proppants are intentionally left behind to stop the fracture from closing onto itself due to the weight and stresses within the formation. The proppants thus literally "prop-apart", or support the fracture to stay open, yet remain highly permeable to hydrocarbon fluid flow since they form a packed bed of particles with interstitial void space connectivity. Sand is one example of a commonly-used proppant. The newly-created-and-propped fracture or fractures can thus serve as new formation drainage area and new flow conduits from the formation to the well, providing for an increased fluid flow rate, and hence increased production of hydrocarbons.

Two or more wells clustered together can be stimulated simultaneously with the same fracturing equipment.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
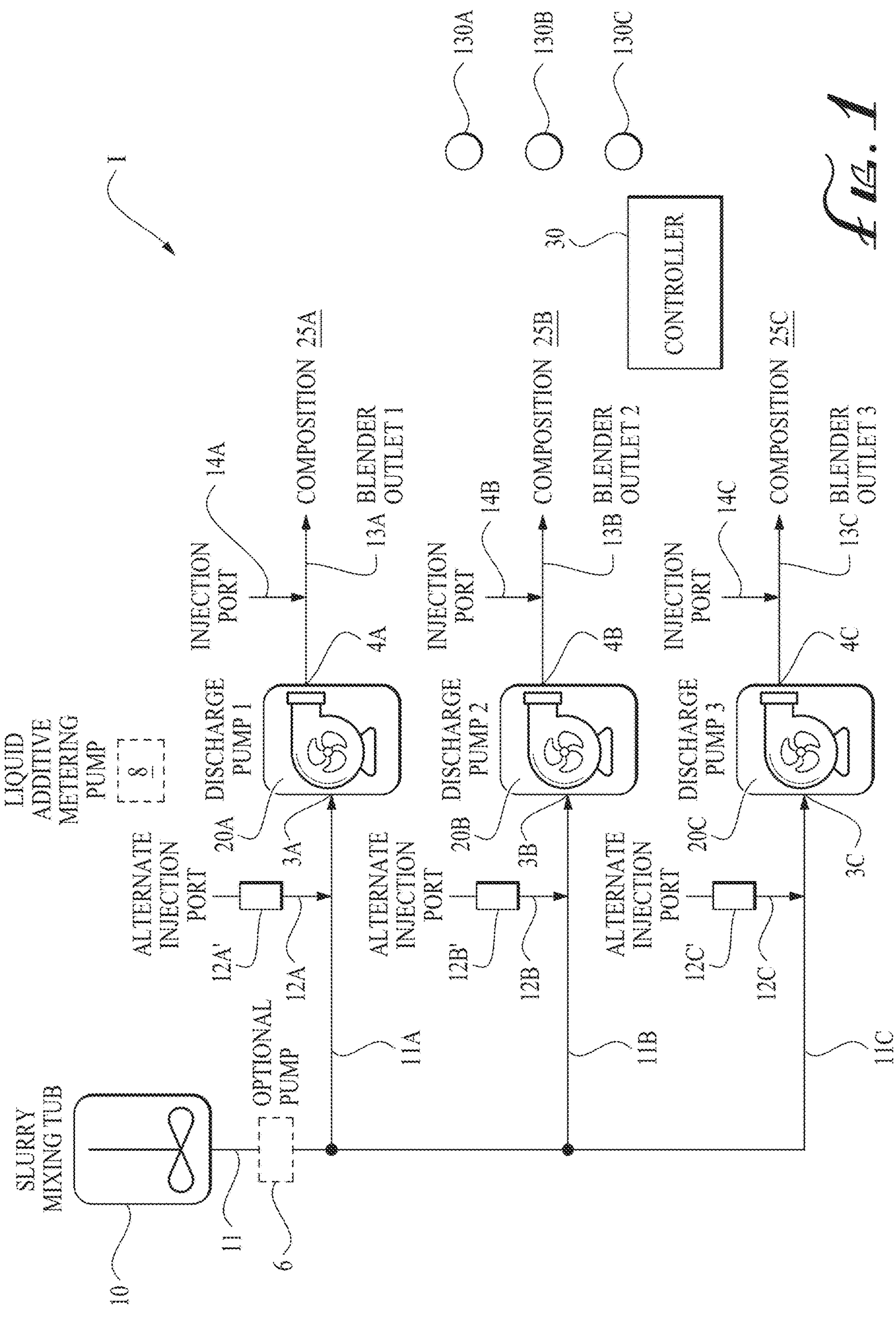
FIG. 1 is a schematic of a blending unit according to embodiments of this disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". For example, reference to discharge pump(s) 20 can, in instances, include discharge pump 20A, discharge pump 20B, discharge pump 20C, or a combination thereof.

A modern fracturing fleet typically includes a water supply, a proppant supply, one or more blenders or "blending units", a plurality of frac pumps, and a fracturing manifold connected to the wellhead. The individual units of the fracturing fleet can be connected to a central control unit called a data van. The control unit can control the individual units of the fracturing fleet to provide proppant slurry at a desired rate to the wellhead. The control unit can manage the pump speeds, chemical intake, and proppant density while pumping fracturing fluids and receiving data relating to the pumping from the individual units.

Multiple well completion techniques can be used to maximize operational use of equipment and personnel. Some oil fields have multiple wells drilled from a single pad. The placement of multiple wells within a single pad or area allows for a smaller footprint of production equipment. Multiple wells on a single pad also can also allow for hydraulic fracturing multiple wells without relocating the fracturing equipment. One such technique, called zipper fracturing, allows a single fracturing fleet to treat multiple wells by alternating the pumping operation from one well to another well. Another technique allows for multiple wells to be treated simultaneously. The hydraulic fracturing fleet can connect to two or more wells to pump the hydraulic fracturing treatment into the two or more wells at the same time.

In embodiments, the fracturing fleet can be divided into a clean pumping group and a dirty pumping group. The clean pumping group pumps "clean" fluid or fluid without proppant. The "dirty" pumping group pumps dirty fluid or fluid with proppant. The clean pumping group can split the fluid output from the high pressure fracturing pumps associated therewith to a first well and a second well. The dirty pumping group can split the dirty fluid output from the fracturing pumps associated therewith into the first well and the second well. Each well, the first well and the second well, can receive a combined treatment volume. The combined treatment volume can be designed to produce the desired fractures within the respective formation. The dirty pumping group can be comprised of pumping equipment with an increased reliability to reduce the chance of equipment malfunction during pumping. The clean pumping group can comprise pumping equipment with a lower reliability than the pumping equipment used for the dirty pumping group, as the clean fluid can be less abrasive and induce a lower level of stress on the pumping equipment. Utilizing pumping equipment with a reduced reliability to pump the less abrasive clean fluid can increase the pumping capacity of the frac fleet.

Accordingly, fracturing ("frac") blenders ("blenders" and "blending units" being used interchangeably herein) have typically been designed for blending fracturing fluid to be delivered to a single well, but now simultaneous multi-well fracturing operations (e.g., simulfrac for two wells and trimulfrac for three wells) are needed. (See, for example, U.S. patent application Ser. No. 11/585,197, U.S. Pat. Nos. 11,248,456, and 11,639,653, the disclosures of each of which are hereby incorporated herein for purposes not contrary to this disclosure).

Compromises are generally accepted when using a blender originally designed for single well operations to mix fluid for simulfrac work. The main issues include the following. Firstly, the transition between clean fluid (also referred to herein as "substantially proppant-free fluid") and proppant laden fluid (e.g., proppant slurry, also referred to herein as "dirty" fluid) must occur at the same time for all wells supplied by the blender, although at times it would perhaps be beneficial to transition to flushing one well while continuing to pump proppant laden fluid to the other well(s). Secondly, a common proppant concentration must be delivered to all wells, although at times it would be desired to change the proppant concentration on one well while continuing to pump the original concentration to the other well(s). Thirdly, the criticality of blender down time is increased with multi frac (e.g., simulfrac, trimulfrac) operations, since blender down time in situations with only one blender can result in non-productive time for multiple wells. Additionally, the frequency of equipment failures can increase for multi-well simultaneous fracturing, since the intensity of blender usage (volume of proppant and fluids pumped per unit time) is generally increased relative to fracturing of a single well.

Accordingly, herein disclosed is a is a multi-well blender design. In embodiments, as further detailed hereinbelow with reference to FIG. 1 to FIG. 6C, a blender of this disclosure can comprise two or more independent outlets and a common proppant laden fluid supply providing fluid to the two or more independent outlets. A blender of this disclosure can comprise a plurality of discharge pumps. Each discharge pump can be dedicated to delivering fluid to a single well of two or three (or more) wells being treated simultaneously. Each discharge pump can be associated with a dilution injection port. By injecting a dilution fluid (e.g., typically water/an aqueous fluid) the composition (e.g., sand/proppant concentration) of the fluid delivered to each well can be customized while mixing proppant in a single mixing tub.

In embodiments, such as described hereinbelow with reference to FIG. 2A and FIG. 2B, a tub bypass valve arrangement connects a substantially proppant-free fluid supply that is substantially free of proppant to the inlet of each discharge pump. This can enable switching to tub bypass for flushing any one well while still pumping proppant laden fluid (e.g., proppant slurry) to other wells.

In embodiments, such as described hereinbelow with reference to FIG. 3A and FIG. 3B, crossover lines connect one (e.g., an extra or "backup") discharge pump to blender outlets of one, two or more other discharge pumps. In this manner, a discharge pump can serve as a backup to one or more other discharge pumps. This can be useful, for example, when the blender is operated in "split flow mode" (e.g., one discharge pump is pumping proppant laden fluid while another discharge pump pumps a substantially proppant-free fluid), and can also be useful when there is a spare pump and the pumps in use are all pumping dirty fluid, as the spare pump can be used as backup.

A blender of this disclosure will now be described with reference to FIG. 1, which is a schematic of a blender or blending unit I according to embodiments of this disclosure. As noted above, a blender of this disclosure can comprise two or more independent outlets, a common proppant laden fluid supply providing fluid to the outlets, a discharge pump dedicated to each outlet and a dilution injection port dedicated to each outlet, where the discharge pump and dilution injection port can be located between the proppant laden fluid supply and the blender outlet. In the embodiment of FIG. 1, blender I comprises three independent outlets or "outlet lines" (e.g., blender outlet line 13A, blender outlet line 13B, and blender outlet line 13C). The common proppant laden fluid supply in line 11 is provided by slurry mixing tub (also referred to herein simply as "mixer") 10 to a first discharge pump 20A dedicated to blender outlet 13A, a second discharge pump 20B dedicated to blender outlet 13B, and a third discharge pump 20C dedicated to blender outlet line 13C. Although sometimes referred to herein as a mixing tub, it is to be understood that mixer 10 can be tubless, in embodiments. The dilution injection port (also referred to herein as a "dilution fluid injection port" or simply as an "injection port") can be upstream of the discharge pump 20 (e.g., discharge pump 20A, 20B, or 20C) or can be downstream from the discharge pump 20. For example, an upstream injection port 12A can be upstream from discharge pump 20A, an upstream injection port 12B can be upstream of discharge ump 20B, and an upstream injection port 12C can be upstream of discharge pump 20C. Alternatively or additionally, a downstream injection port 14A can be downstream from discharge pump 20A, a downstream injection port 14B can be downstream from discharge pump 20B, and a downstream injection port 14C can be downstream from discharge pump 20C. The discharge pump 20 and associated dilution injection port 12/14 are located between the proppant laden fluid supply from mixing tub 10 and the blender outlet line 13.

A blending unit of this disclosure can comprise two or more discharge pumps 20, each of the two or more discharge pumps 20 having a suction inlet 3 fluidly connected to a common proppant fluid supply (e.g., from mixing tub 10) via a concentrated proppant supply or inlet line 11, and a discharge outlet 4 fluidly connected to a blender outlet line 13; and an injection port 12 upstream of the discharge pump 20 and configured to inject substantially proppant-free fluid into the concentrated proppant inlet line 11, an injection port 14 downstream from the discharge pump 20 and configured to inject substantially proppant-free fluid into the blender outlet line 13, or both an injection port 12 upstream of the discharge pump 20 and an injection port 14 downstream from the discharge pump 20. For example, with reference to the embodiment of FIG. 1, blending unit I comprises three discharge pumps 20A, 20B, and 20C. Each of the three discharge pumps 20A/20B/20C has a suction inlet 3A/3B/3C fluidly connected to common proppant fluid supply (e.g., from slurry mixing tub 10 via common proppant supply line 11) via a concentrated proppant inlet line 11A/11B/11C, and a discharge outlet 4A/4B/4C fluidly connected to a blender outlet line 13A/13B/13C; and an injection port 12A/12B/12C upstream of the discharge pump 20A/20B/20C and configured to inject substantially proppant-free fluid into the concentrated proppant inlet line 11A/11B/11C, an injection port 14A/14B/14C downstream from the discharge pump 20A/20B/20C and configured to inject substantially proppant-free fluid into the blender outlet line 13A/13B/13C, or both an injection port 12A/12B/12C upstream of the discharge pump 20A/20B/20C and an injection port 14A/14B/14C downstream from the discharge pump 20A/20B/20C. The common proppant fluid supply in common proppant supply line 11 can comprise a concentrated proppant slurry from a single mixer (e.g., mixing tub) 10, in embodiments.

As described further hereinbelow with reference to FIG. 7, FIG. 8, and FIG. 9, a blender outlet line 13 of a first of the two or more discharge pumps 20 can be fluidly connected with a first well 130 and a blender outlet line 13 of a second of the two or more discharge pumps 20 can be fluidly connected with a second well 130, wherein the first well and the second well are different wells. For example, a blender outlet line 13A of a first discharge pump 20A of the two or more discharge pumps 20 can be fluidly connected with a first well 130A and a blender outlet line 13B of a second discharge pump 20B of the two or more discharge pumps 20 can be fluidly connected with a second well 130B, wherein the first well 130A and the second well 130B are different wells. In embodiments, a blending unit of this disclosure comprises a third discharge pump 20C. The third discharge pump (e.g., discharge pump 20C) can be utilized as a backup discharge pump (as described further hereinbelow with reference to FIG. 3A and FIG. 3B) and/or third discharge pump 20C can be fluidly connected with a third well 130C. The discharge pumps 20 (e.g., 20A, 20B, 20C, etc.) can simultaneously provide compositions 25 (e.g., 25A, 25B, 25C, etc.) from the independent blender outlet lines 13 (e.g., 13A, 13B, 13C, etc.).

The blending unit of this disclosure can further comprise a control system 30 operable to control operation of the blending unit I to provide a desired slurry composition from each of the blender outlet lines. The blending unit of this disclosure enables the fluid composition provided via the blender outlet line 13 of at least one of the two or more discharge pumps 20 to have a different proppant concentration than the slurry composition provided by the blender outlet line 13 of at least one other of the plurality (e.g., two or more) discharge pumps 20. Accordingly, a first composition 25A provided by the first discharge pump 20A can be the same as or different from a second composition 25B provided by the second discharge pump 20B, and so on. For example, in embodiments, a third composition 25C provided by a third discharge pump 20C can be the same as or different from the first composition 25A, the second composition 25B, or both. As described further hereinbelow, utilization of the upstream injection ports 12 and/or downstream injection ports 14 enables the production of independent, disparate compositions 25 from each of the blender outlet lines 13. As the common proppant supply provided by mixing tub 10 and extracted therefrom via common proppant supply line 11 has a fixed composition (e.g., a "concentrated proppant concentration"), the compositions 25 in blender outlet lines 13 can have a proppant concentration of up to the concentrated proppant concentration of the common supply (that is, the proppant concentration can be diluted when dilution fluid is introduced via the upstream injection ports 12 or the downstream injection ports 14, but will not be higher than the concentrated proppant concentration of the common proppant supply provided by mixer 10). As described further hereinbelow with reference to FIG. 2A and FIG. 2B, in embodiments, the composition 25 provided in blender outlet line 13 can be substantially proppant-free (e.g., when a concentrated proppant valve CPV on concentrated proppant line 13 is closed).

In embodiments, the injection port associated with at least one of the two or more discharge pumps 20 is downstream (e.g., is a downstream injection port 14) from the at least one of the two or more discharge pumps 20.

In embodiments a blender of this disclosure can be equipped with a single mixing tub, multiple discharge pumps, and tub bypass valves to each discharge pump. As discussed further hereinbelow, such a blending unit can be utilized, for example, to flush a first well while simultaneously providing proppant laden fluid to a second well.

Figure 2A:
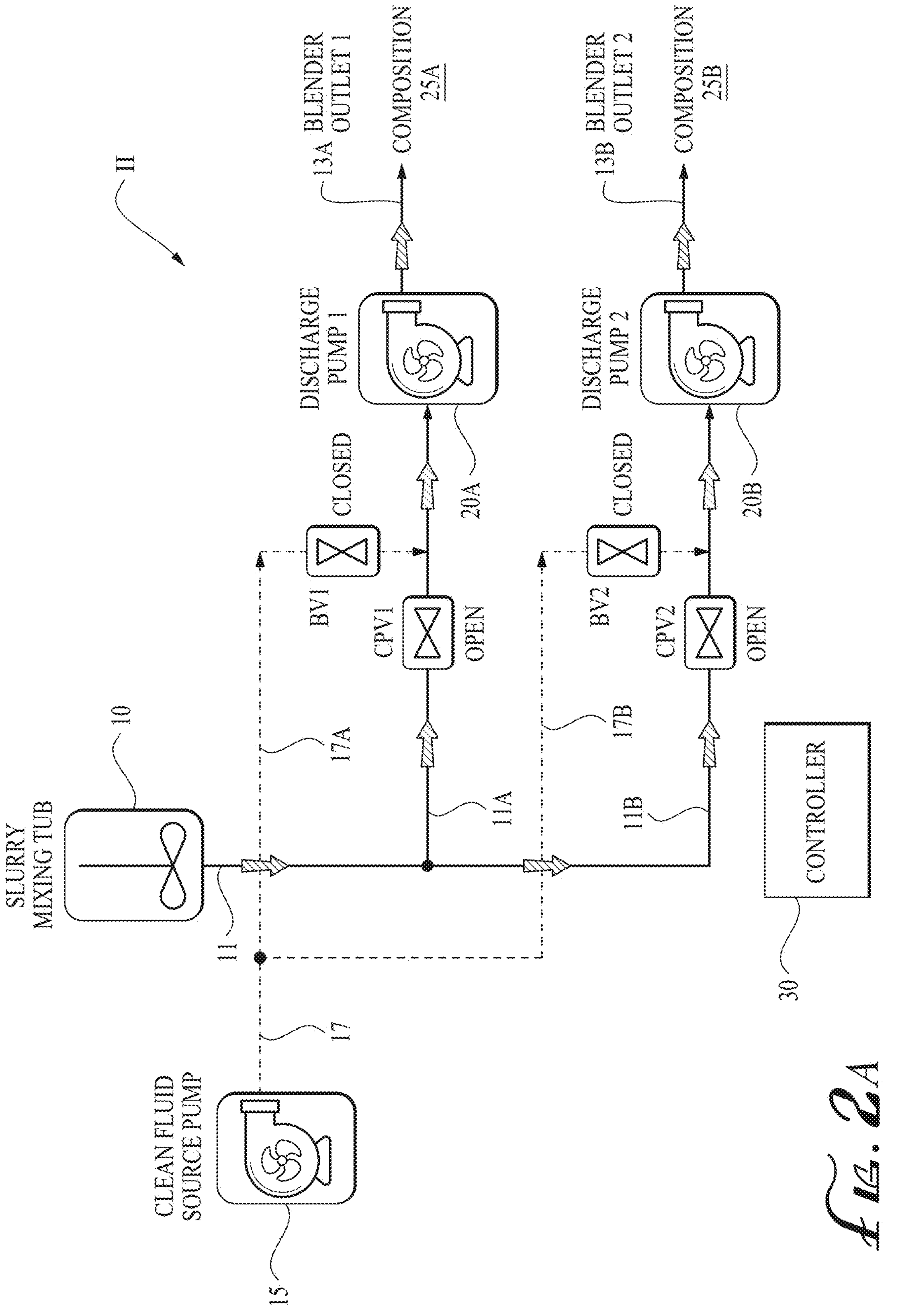
FIG. 2A is a schematic of a blending unit according to embodiments of this disclosure, in a first configuration.
Figure 2B:
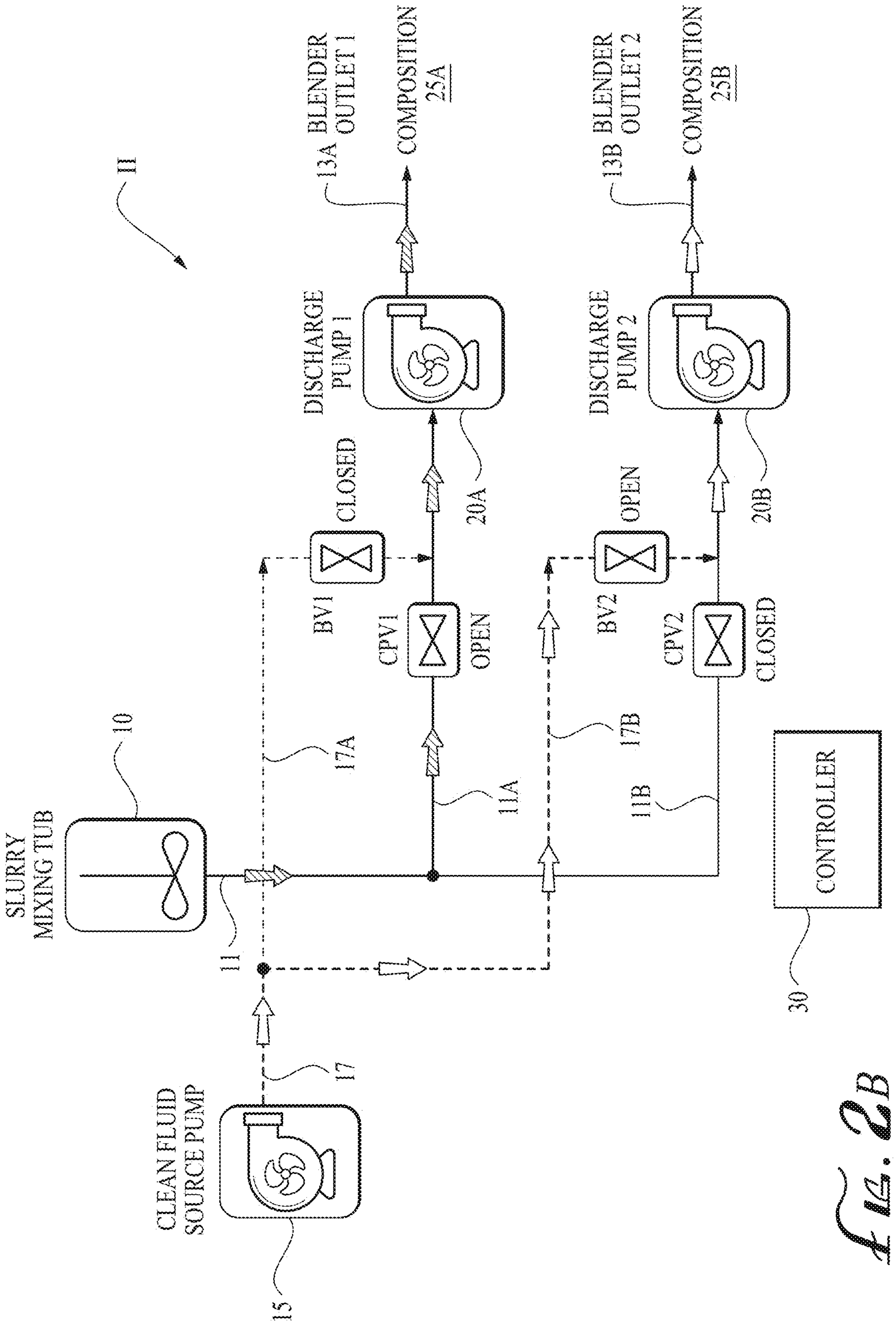
FIG. 2B is a schematic of the blending unit of FIG. 2A, in a second configuration.

With reference now to FIG. 2A, which is a schematic of a blending unit II according to embodiments of this disclosure, in a first configuration; and FIG. 2B, which is a schematic of the blending unit II of FIG. 2A, in a second configuration, the injection port 12/14 of each of the two or more discharge pumps 20 can comprise a bypass valve BV configured to introduce the substantially proppant-free fluid 17 (e.g., optionally via a pump 15) in substantially proppant-free fluid line 17A/17B/17C to the concentrated proppant inlet line 11A/11B/11C or the blender outlet line 13A/13B/13C, whereby substantially proppant-free fluid (e.g., water, fresh water, produced water, flowback water, etc.) can be introduced via the injection port 12/14 of each of the two or more discharge pumps 20 by opening the bypass valve BV associated therewith. For example, in the embodiment of FIG. 2A, blending unit II comprises a first discharge pump 20A and a second discharge pump 20B, each discharge pump 20A/20B has a discharge inlet 3A/3B fluidly connected via concentrated proppant inlet line 11A/11B to common proppant supply 11, and each discharge pump 20A/20B having a discharge outlet 4A/4B fluidly connected with blender outlet line 13A/13B.

Each of the two or more discharge pumps 20A/20B is associated with a bypass valve BV1/BV2 configured to introduce the substantially proppant-free fluid 17 (e.g., optionally via a pump 15) to the concentrated proppant inlet line 11A/11B/11C (or the blender outlet line 13A/13B/13C, not shown in FIG. 2A/2B) whereby substantially proppant-free fluid can be introduced via the bypass valve BV1/BV2 (as the injection port 12/14) of the discharge pump 20A/20B by opening the bypass valve BV1/BV2 associated therewith. Although described as bypass or tub bypass valves BV, the substantially proppant-free fluid 17 in substantially proppant-free fluid lines 17A/17B/17C can be provided from a same source as a substantially proppant-free fluid (e.g., water 112 in FIG. 7, water 112A in FIG. 8 and FIG. 9, described hereinbelow) utilized to prepare concentrated proppant in mixing tub 10 (and can thus be provided via a "bypass" around the tub 10), or can be a separate substantially proppant-free fluid source. Furthermore, although a single substantially proppant-free fluid source is depicted in the Figures, in embodiments a plurality of substantially proppant-free fluid sources can be connected with each of the discharge pumps 20. For example, in embodiments, a blending unit can comprise substantially proppant-free inlet lines 17 for substantially proppant-free fluid comprising fresh water, substantially proppant-free inlet lines 17 for substantially proppant-free fluid comprising produced water, substantially proppant-free inlet lines 17 for substantially proppant-free fluid comprising brine, etc., or a combination thereof.

As depicted in the embodiment of FIG. 2A and FIG. 2B, each of the two or more discharge pumps 20 can further comprise a concentrated proppant valve CPV on the concentrated proppant inlet line 11A/11B, and operable to produce a proppant slurry (e.g., composition 25A or 25B) comprising a proppant from the blender outlet line 13A/13B of at least one of the two or more discharge pumps 20A/20B and simultaneously produce a substantially proppant-free fluid (e.g., composition 25A or 25B) from the blender outlet line 13A/13B of at least one other of the two or more discharge pumps 20A/20B by opening the bypass valve BV1/BV2 and closing the concentrated proppant valve CPV1/CPV2 associated with the at least one other of the at least two discharge pumps 20A/20B. For example, in the configuration of FIG. 2A, CPV1 is open and BV1 is closed, such that composition 25A from blender outlet line 13A comprises proppant slurry, and CPV2 is open and BV2 is closed such that composition 25B from blender outlet line 13B also comprises proppant slurry. In an alternate example, CPV1 and CPV2 can both be open and one or both of BV1 and BV2 partially open, such that diluted slurry is being provided at the blender outlets 13. In the configuration of blending unit II depicted in FIG. 2B, CPV1 remains open and BV1 remains closed, such that composition 25A from blender outlet line 13A still comprises proppant slurry, while CPV2 is closed and BV2 is opened, such that composition 25B from blender outlet line 13B can comprise substantially proppant-free fluid.

Figure 2C:
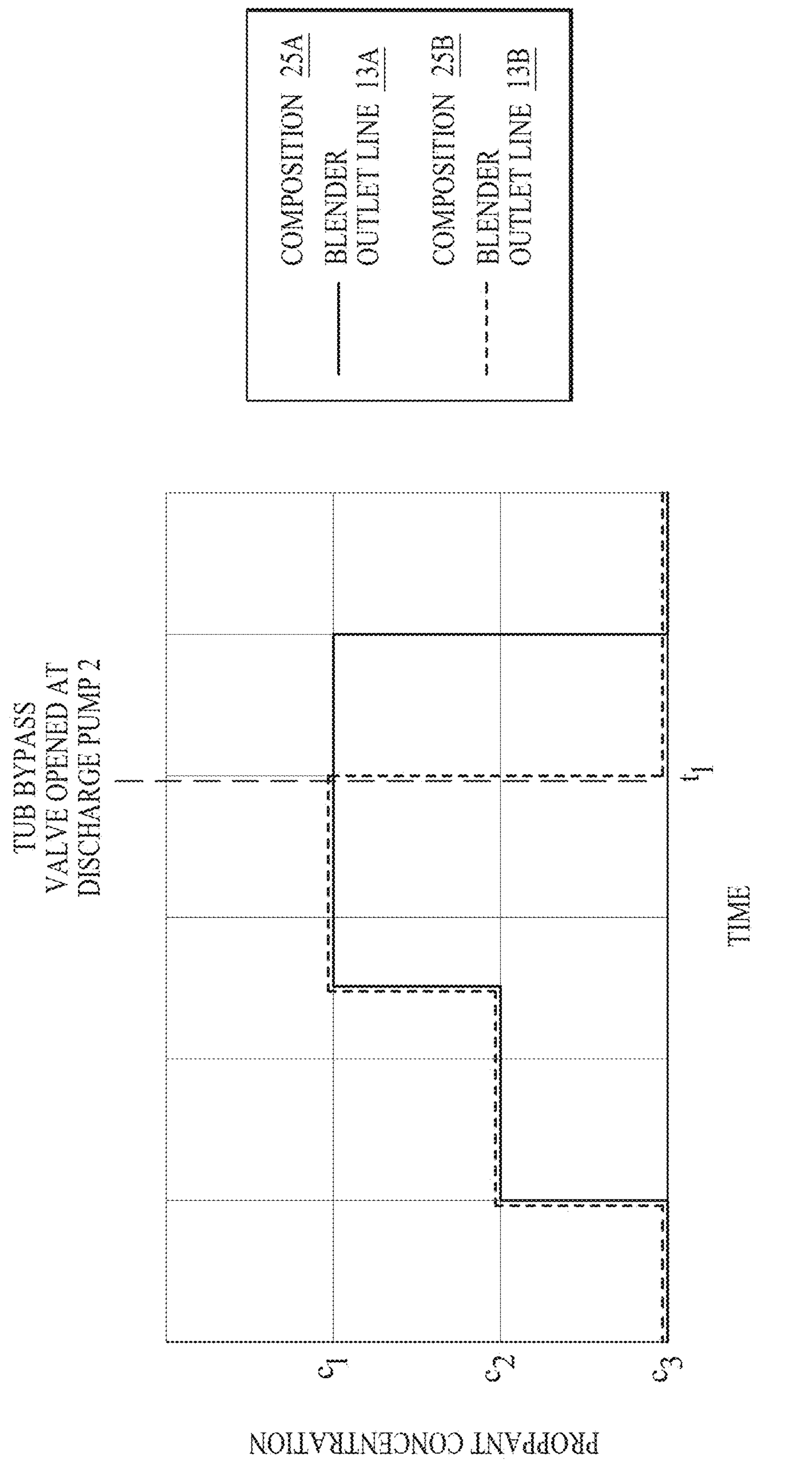
FIG. 2C is a graph of proppant concentration as a function of time during example usage of a blending unit of this disclosure.

FIG. 2C is a graph of proppant concentration as a function of time during example usage of a blending unit II of FIG. 2A and FIG. 2B. At time t1, bypass valve BV2 is opened and concentrated proppant valve CPV2 closed, such that the composition 25B in blender outlet line 13B transitions from proppant slurry having a proppant concentration C1 to substantially proppant-free fluid having proppant concentration C3 of zero proppant.

In embodiments, a blending unit of this disclosure comprises three (or more) discharge pumps 20 with a common primary supply source 10 for proppant laden fluid and a secondary common supply source 17' (e.g., substantially proppant-free fluid 17) consisting of fluid substantially free of proppant, where the fluid source (e.g., concentrated proppant from mixer 10 and/or substantially proppant-free fluid from pump 15) to each discharge pump 20 can be independently selected, and three (or more) blender outlet lines 13 (e.g., 13A/13B/13C). In embodiments, a different clean fluid source 17' can be connected to each of the BV/injection ports (e.g., a different clean fluid 17 can be fluidly connected to each of the bypass valve injection ports.

The blending unit can comprise one or more crossover lines (or paths) that selectively connect one (e.g., a second discharge pump) to the blender outlet lines of one or more of the other discharge pumps (e.g., to the blender outlet lines of both the first and third discharge pumps).

Figure 3A:
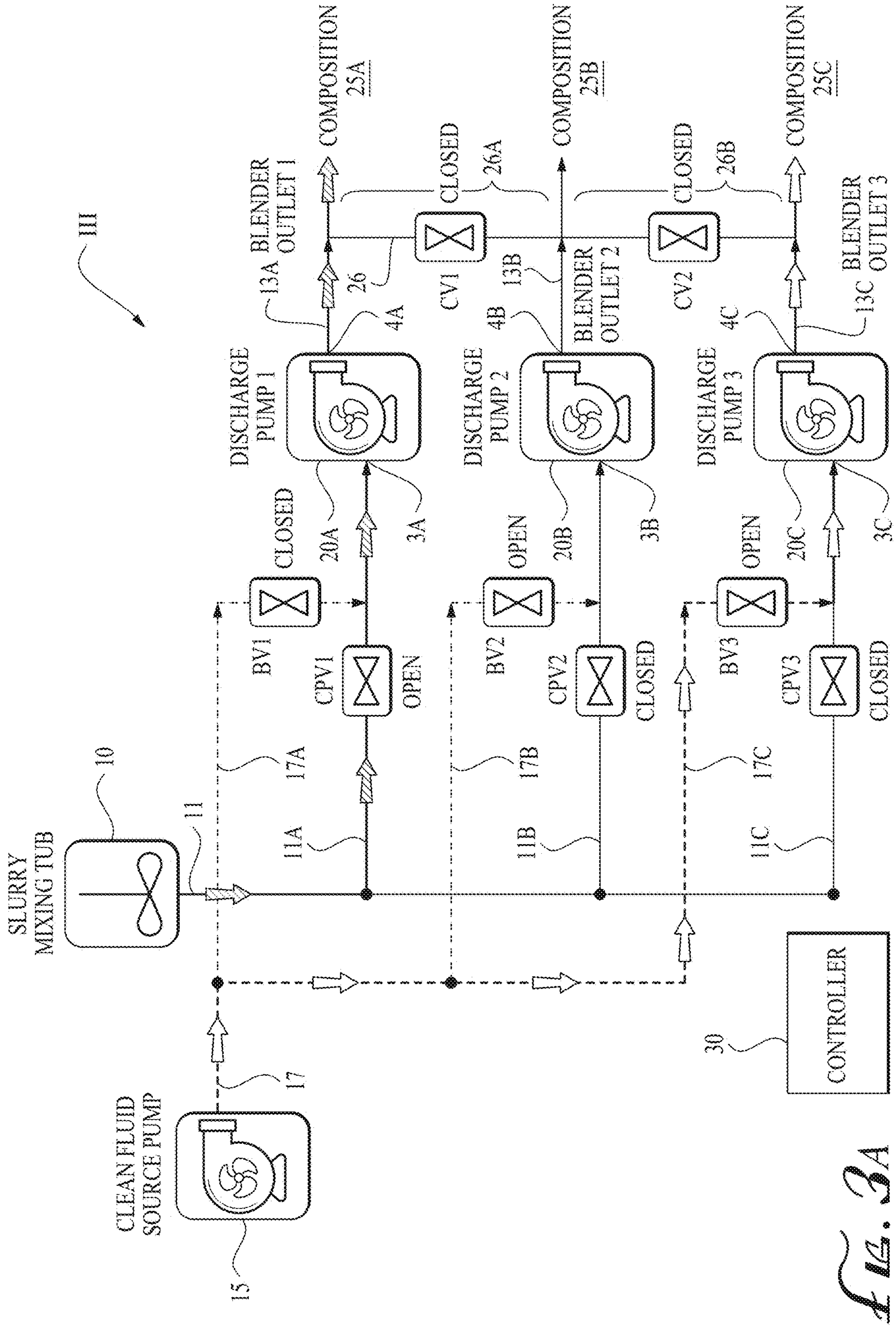
FIG. 3A is a schematic of a blending unit according to embodiments of this disclosure, in a first configuration.
Figure 3B:
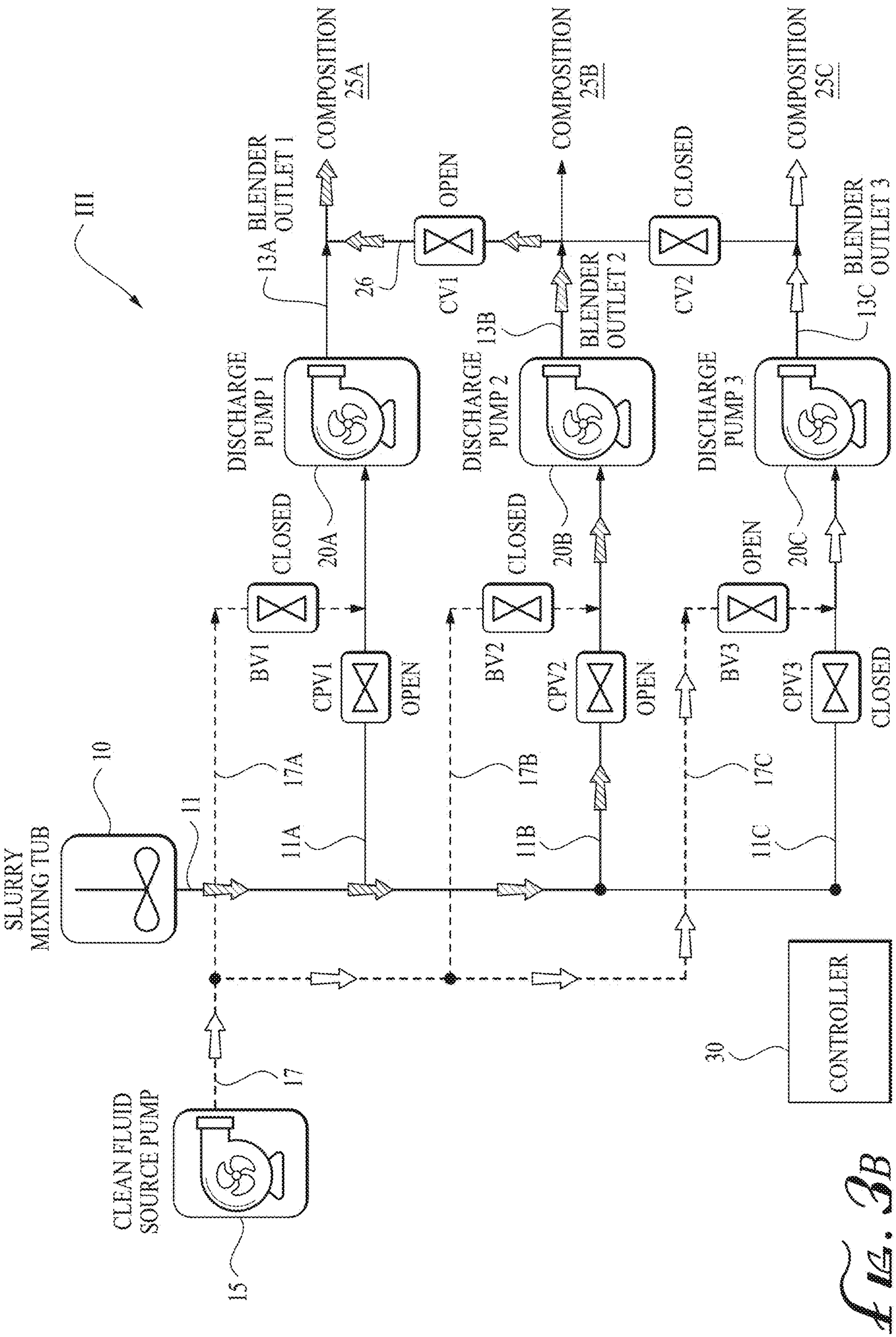
FIG. 3B is a schematic of the blending unit of FIG. 3A, in a second configuration.

With reference now to FIG. 3A, which is a schematic of a blending unit III according to embodiments of this disclosure, in a first configuration; and FIG. 3B, which is a schematic of the blending unit III of FIG. 3A, in a second configuration, a blending unit of this disclosure can comprise a crossover line or path 26 fluidly connecting the discharge outlet 4 (e.g., 4A/4B/4C) of each of the two or more discharge pumps 20 (e.g., 20A/20B/20C) with the blender outlet line 13 (e.g., 13A/13B/13C) fluidly connected with at least one other of the at least two discharge pumps 20, and a crossover valve CV (e.g., CV1/CV2/CV3) on the crossover line 26. The crossover valve CV can be opened or closed to permit or prevent fluid flow between the each of the two or more discharge pumps 20 and the blender outlet line 13 of at least one other of the at least two discharge pumps 20. For example, as depicted in the embodiment of FIG. 3A, crossover line 26 can comprise crossover line 26A and 26B. Crossover line 26A fluidly connects the discharge outlet 4B of discharge pump 20B with the blender outlet line 13A fluidly connected with discharge pump 20A and crossover line 26B fluidly connects the discharge outlet 4B of discharge pump 20B with the blender outlet line 13C fluidly connected with discharge pump 20C, such that each of the discharge pumps 20 can be connected with the blender outlet line of each of the other discharge pumps 20. In the embodiment of FIG. 3A and FIG. 3B, crossover valve CV1 is positioned on line 26A of crossover line 26 and a crossover valve CV2 is positioned on line 26B of crossover line 26. Crossover valve CV1 can be opened to permit fluid flow between discharge pump 20B and blender outlet line 13A, thus enabling discharge pump 20B to operate as a backup discharge pump for discharge pump 20A. Alternatively, crossover valve CV2 can be opened to permit fluid flow between discharge pump 20B and blender outlet line 13C, thus enabling discharge pump 20B to operate as a backup discharge pump for discharge pump 20C. As depicted in FIG. 6, CV1 can connect directly to the outlets 13A'/13B' of outlet lines 13A and outlet line 13B and CV2 can connect directly to the outlet 13B'/13C' of outlet lines 13B and 13C.

FIG. 3A shows a configuration in which discharge pump 20A and discharge pump 20C are being utilized to simultaneously, independently pump compositions 25A and 25C via blender outlet lines 13A and 13C, respectively. Composition 25A can be a proppant slurry, while composition 25C can be a substantially proppant-free fluid, as concentrated proppant valve CPV3 is closed and bypass valve BV3 is open. However, in embodiments this backup feature can still be provided even if composition 25A and 25C are both dirty fluids (for example, if one or both of the BV valves BV1 and/or BV3 are partially open to provide slurry dilution). In the depiction of FIG. 3A, crossover valves CV1 and CV2 are closed. Concentrated proppant slurry valve CPV2 (and, if present a bypass valve BV2) can be closed, as discharge pump 20B is not in operation in this configuration. FIG. 3B shows a configuration in which discharge pump 20B is operating as backup for discharge pump 20A. As shown, discharge pump 20A and discharge pump 20B are both being utilized to pump a composition 25A comprising proppant via blender outlet line 13A, as concentrated proppant valve CPV1 and CPV2 are both open (and bypass valve BV1 and bypass BV2 are closed); discharge pump 20C is being utilized to simultaneously pump composition 25C (comprising substantially proppant-free fluid, in this example) via blender outlet line 13C. Again composition 25C comprises a substantially proppant-free proppant fluid, as concentrated proppant valve CPV3 is closed and bypass valve BV3 is open. In this configuration, crossover valve CV1 is open and crossover valve CV2 is closed. Alternatively, if operating in the configuration of FIG. 3A, and discharge pump 20C is failed or failing and discharge pump 20A is operable, discharge pump 20B could be utilized as backup to discharge pump 20C, if needed, for example, by closing concentrated proppant valve CV2 and opening bypass valve BV2 and keeping crossover valve CV1 closed and opening crossover valve CV2. Accordingly, a single discharge pump (e.g., discharge pump 20B in the previously discussed example) can act as a backup for one or more of the other discharge pumps 20, whether they are pumping a proppant slurry composition 25 or a substantially proppant-free fluid 25.

Although depicted in the exemplary FIGUREs as having two or three discharge pumps 20 and associated components, any number of discharge pumps 20 and associated concentrated slurry inlet lines 11, blender outlet lines, injection ports 12/14 or bypass valves BV, concentrated slurry valves CV, and/or crossover lines 26 and crossover valves CV, can be utilized, in embodiments. For example, a blending unit of this disclosure can comprise any number of discharge pumps and associated components. In embodiments, the blending unit of this disclosure can comprise three blender outlets and three associated discharge pumps, as depicted in FIG. 1, FIG. 3A/3B, and FIG. 4 described hereinbelow. However, alternate embodiments can include one discharge pump 20 (as depicted in the embodiment of FIG. 5, discussed hereinbelow, two discharge pumps 20 (as depicted in the embodiments of FIG. 2A and FIG. 2B), four, or more discharge pumps 20 and associated discharge outlets 4 and blender outlet lines 13. The number of blender outlets 13 can be equivalent to a maximum number of wells 130 that can be simultaneously fractured with independent proppant (e.g., sand) concentrations provided via the blending unit (unless further splitting and blending is also performed on the high pressure side/downstream of the blending unit and upstream of the wells). In embodiments, the number of discharge pumps 20 can be twice the number of wells if the blender contains pumps for pumping to both the clean and dirty HHP units 122 (e.g., dirty fluid group 250 and a clean fluid group 260 described hereinbelow with reference to FIG. 9), or even more if some built-in backup pumps are included.

Figure 4:
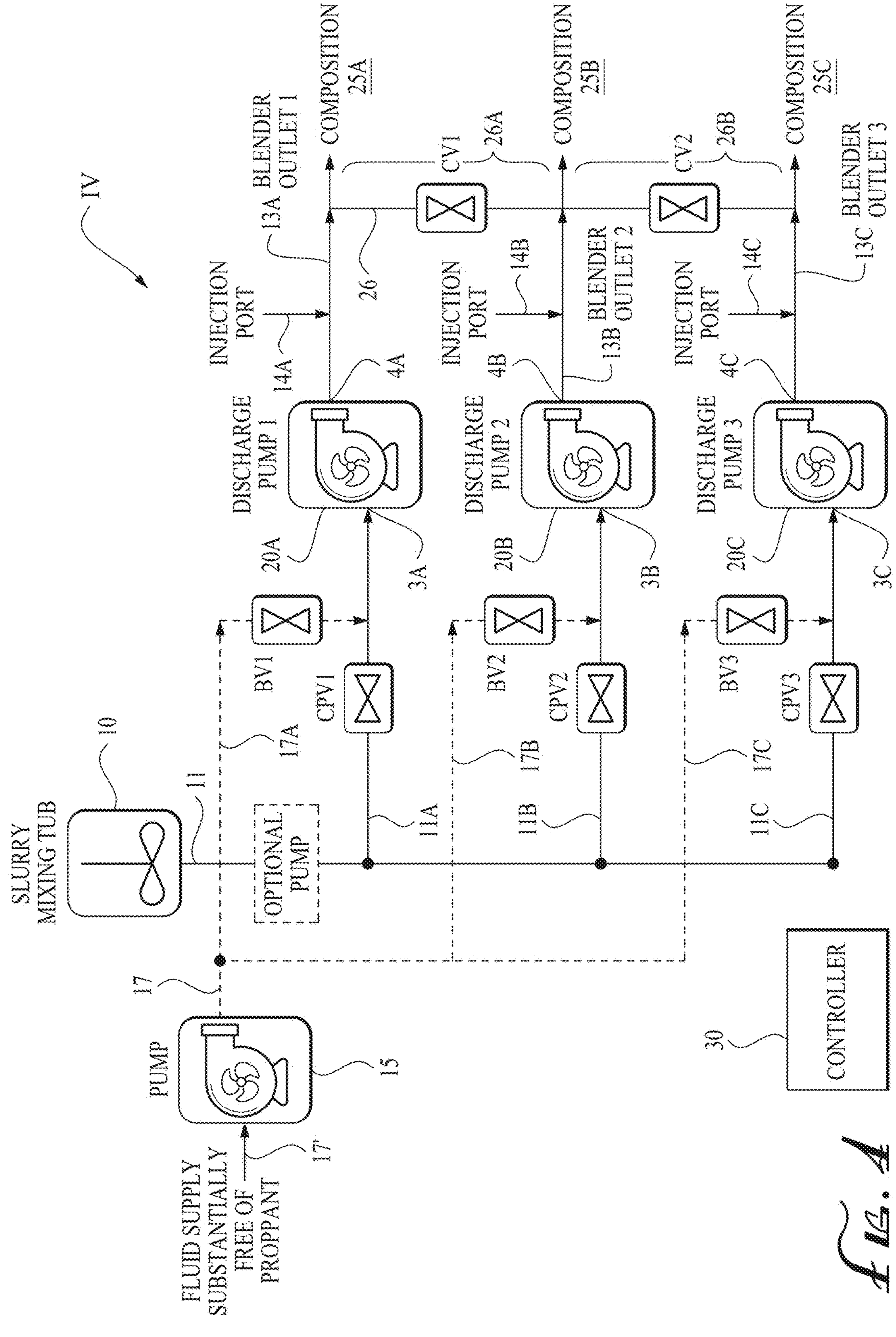
FIG. 4 is a schematic of a blending unit according to embodiments of this disclosure.
Figure 5:
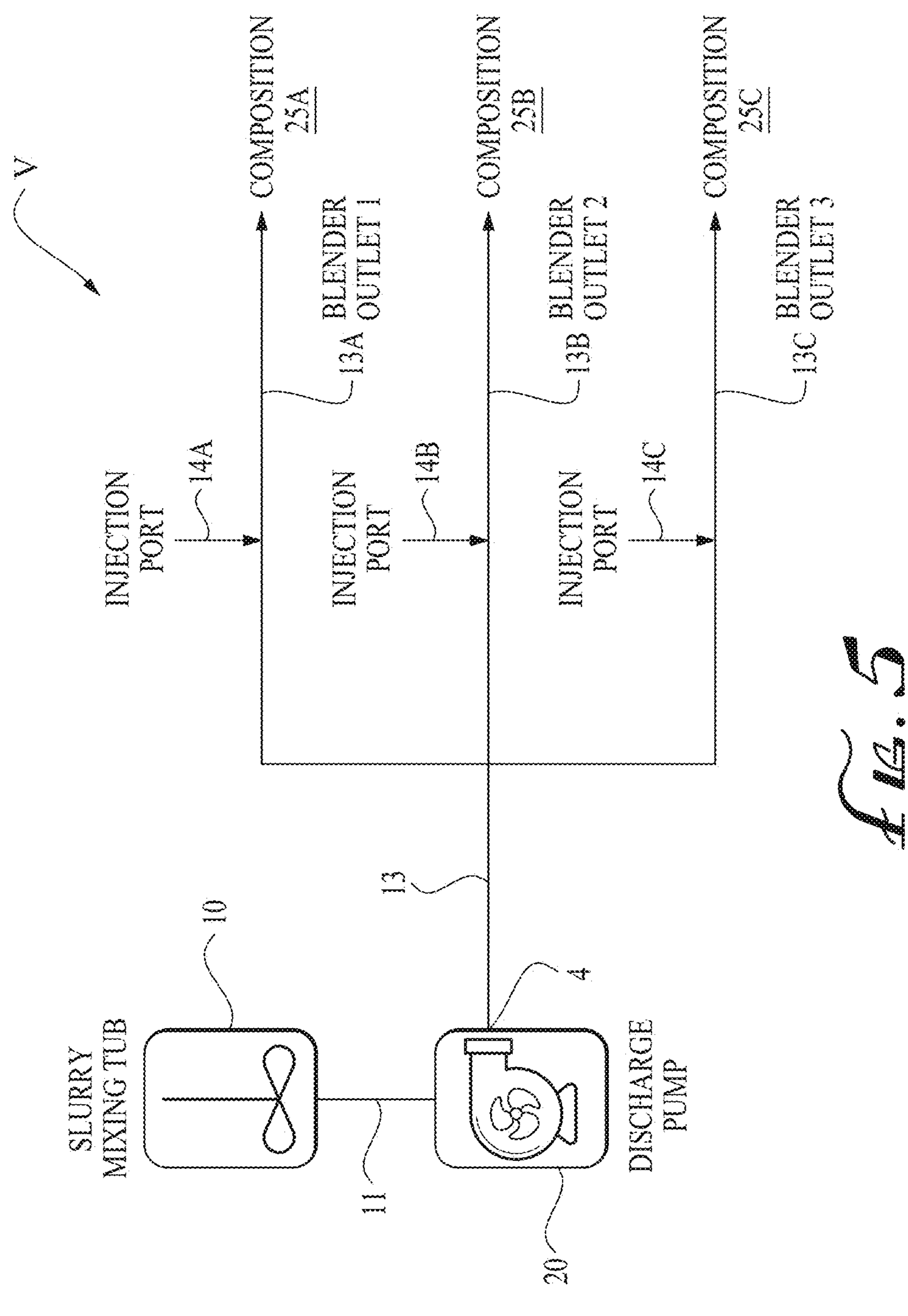
FIG. 5 is a schematic of a blending unit according to embodiments of this disclosure.

With reference to FIG. 4, which is a schematic of a blending unit IV according to embodiments of this disclosure, blending unit of this disclosure can comprise one or more of the previously discussed features. For example, blending unit IV comprises multiple discharge pumps 20 (with three, discharge pump 20A, discharge pump 20B, and discharge pump 20C shown in the embodiment of FIG. 4) and a single mixer 10. Each of the discharge pumps 20 has associated suction inlets 3 (e.g., 3A/3B/3C), discharge outlets 4 (e.g., 4A/4B/4C), independent blender outlet lines 13 (e.g., 13A/13B/13C) and concentrated slurry inlet lines 11 (e.g., 11A/11B/11C). Each discharge pump 20 can further be associated with a bypass valve BV (e.g., BV1/BV2/BV3), a concentrated proppant valve CPV (e.g., CPV1/CPV2/CPV3), a crossover line 26 (e.g., 26A/26B) connecting the output thereof with a blender outlet line 13 of another discharge pump and having thereon a crossover valve CV (e.g., CV1/CV2), a downstream injection port 14 (e.g., downstream injection port 14A/14B/14C), or a combination thereof. Thus, a blender of this disclosure can comprise one or more of the novel components described hereinabove, with the embodiment of FIG. 4 depicting a more complicated blending unit IV comprising both bypass valves BV, concentrated proppant valves CPV, crossover lines 26 with associated crossover valves CV, and downstream injection ports 14.

In embodiments, such as depicted in FIG. 5, which is a schematic of a blending unit V according to embodiments of this disclosure, a blending unit of this disclosure can comprise a single discharge pump 20 that can be utilized to supply the multiple (e.g., three) blender outlet lines 13 (e.g., blender outlet line 13A, blender outlet line 13B, and blender outlet line 13C). In such embodiments, the dilution injection ports 14 can be downstream fluid injection ports 14 located downstream of the single discharge pump 20 and downstream of where discharge pump outlet line 13 branches to provide the multiple (e.g., three) independent blender outlet lines 13 (e.g., 13A, 13B, and 13C in the embodiment of FIG. V).

Figure 6A:
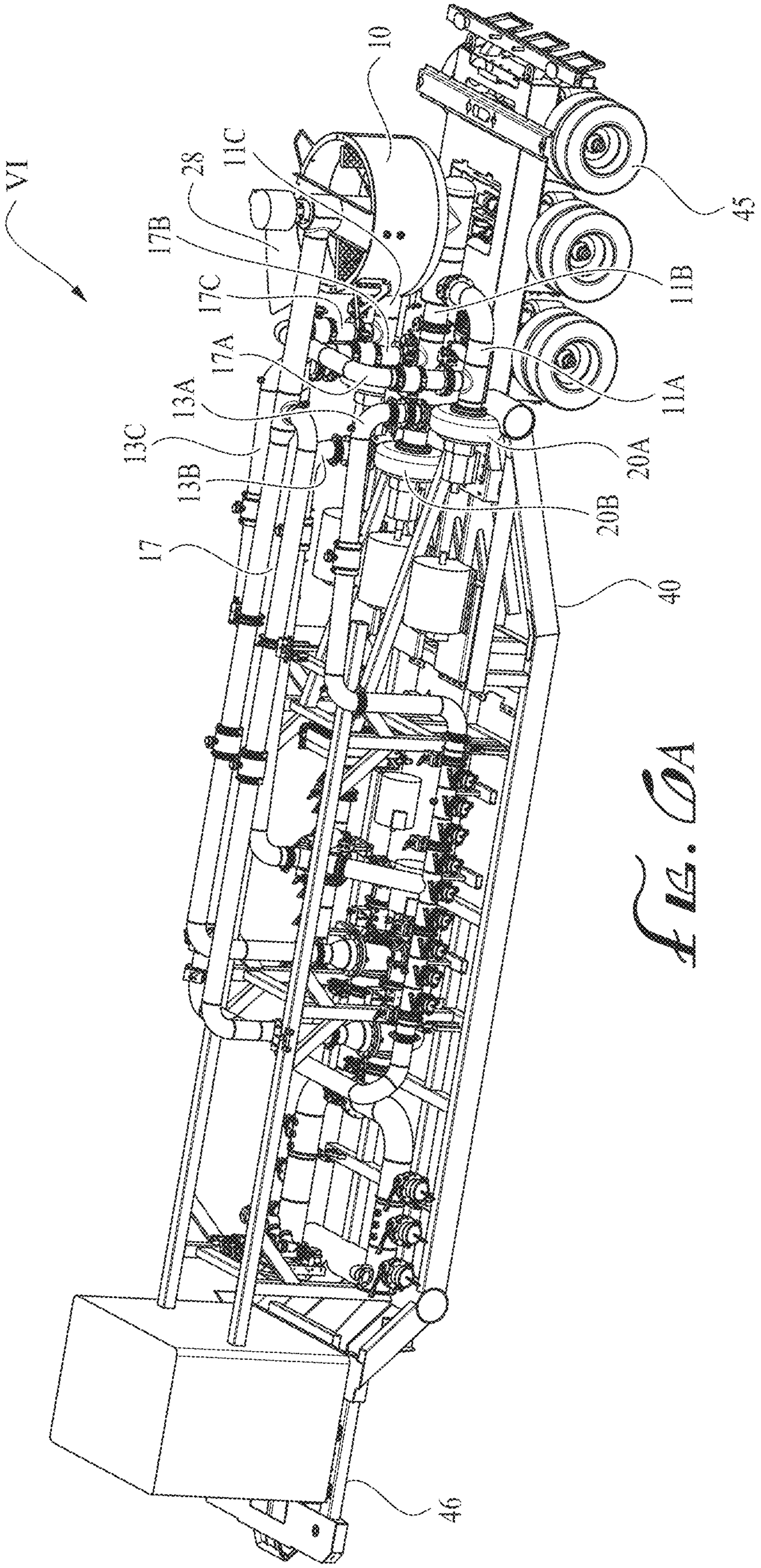
FIG. 6A is a schematic diagram of a blender layout, according to embodiments of this disclosure.
Figure 6B:
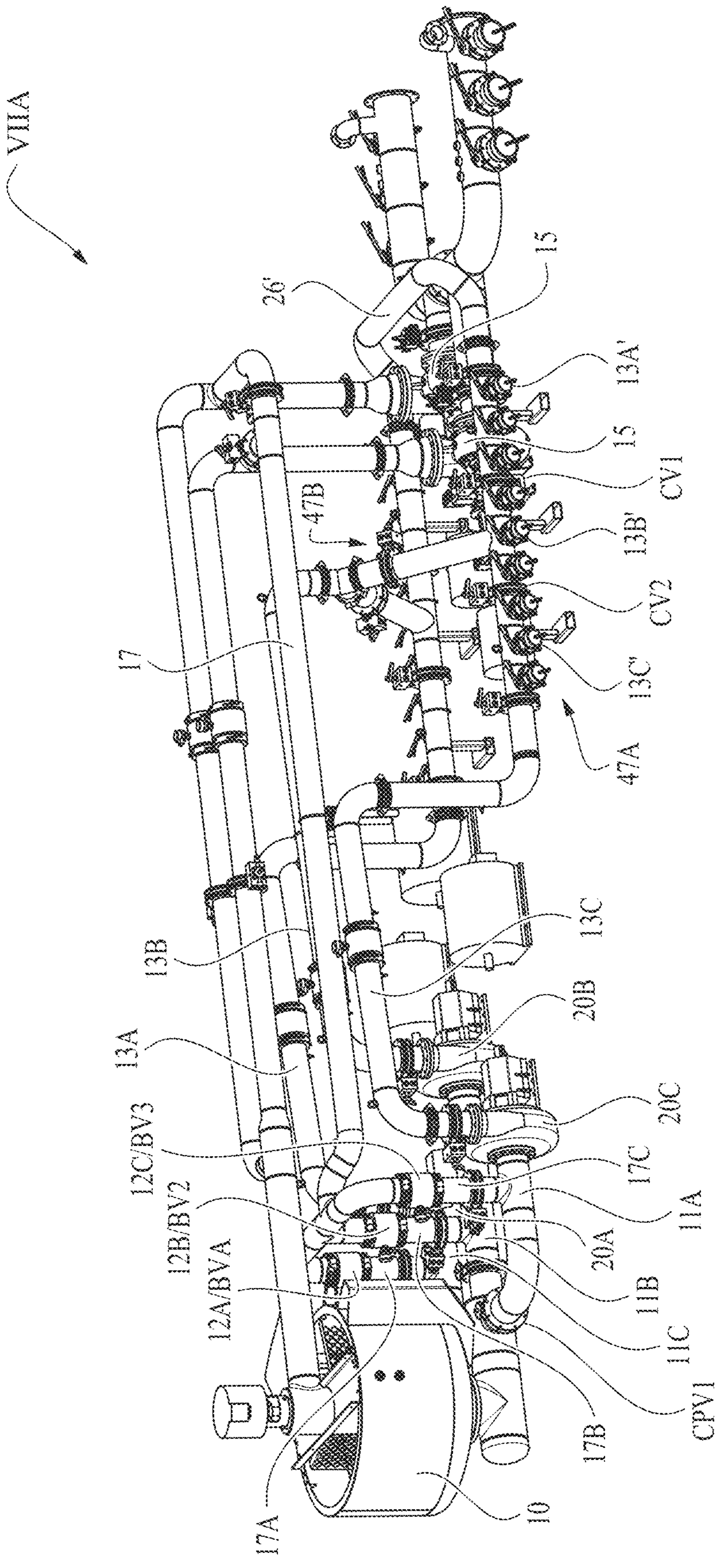
FIG. 6B is a schematic diagram of a first view of an example blender piping of a blender layout of FIG. 6A, according to embodiments of this disclosure.
Figure 6C:
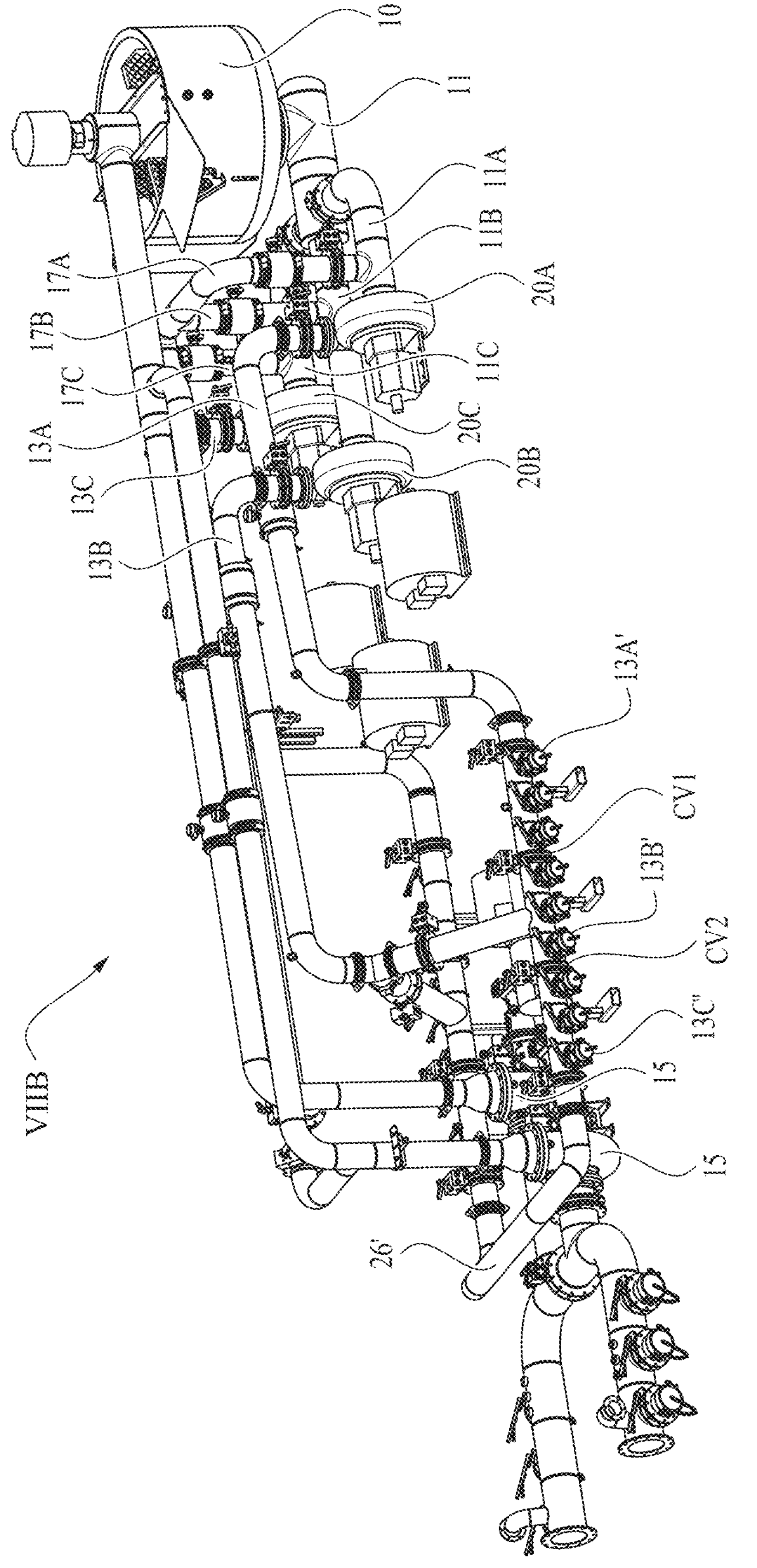
FIG. 6C is a schematic diagram of a second view of the example blender piping of FIG. 6B.

The blending unit of this disclosure can be configured on a trailer, a skid, a truck, multiple trailers, multiple skids, multiple trucks, or a combination thereof. FIG. 6A is a schematic diagram of a blender layout VI, according to embodiments of this disclosure, FIG. 6B is a schematic diagram of a first view VIIA of an example blender piping of a blender layout VI of FIG. 6A, according to embodiments of this disclosure, and FIG. 6C is a schematic diagram of a second view VIIB of the example blender piping of FIG. 6B. In this layout VI, the blending unit is positioned on a trailer comprising a support structure 40, a connection 46 for connection to a rig/tractor, and wheels 45. Alternatively or additionally, the blending unit (e.g., blending unit I/II/III/IV/V of FIGS. 1-5) can be mounted on a skid that can be removable from a trailer/truck bed, and/or can be assembled via more than one skid (e.g., mixing tub 10 on one skid and discharge pumps 20 on one or more other skids, etc.). The mixing tub 10 has two or more independent outlets or concentrated slurry inlet lines 11, as discussed hereinabove, with three (11A/11B/11C) depicted in the layout of FIG. 6A, FIG. 6B, and FIG. 6C. As discussed hereinabove, each outlet can supply a proppant laden (or clean) fluid to a particular well. In embodiments, such as depicted, the blender can be equipped with three outlets 13 such that it can deliver compositions 25 comprising independent proppant (e.g., sand) concentrations for fracturing three wells simultaneously. The depicted blending unit in FIG. 6A, FIG. 6B, and FIG. 6C is equipped with three discharge pumps 20A/20B/20C, each pressurizing the fluid to one of the independent blender outlets 13A/13B/13C, as described hereinabove.

Instead of the blending unit I/II/III/IV/V being trailer or skid mounted, it could be provided via modular subsystems transported separately and coupled together fluidly, mechanically, or electrically at the work location (e.g., at or proximate the wellsite(s) 130). In embodiments, the blending unit I/II/III/IV/V can be packaged as a single unit on either a trailer frame or a skid. The equipment on the blending unit can be powered hydraulically, electrically, mechanically, pneumatically, or a combination of these power types.

As noted hereinabove and depicted in FIG. 6A, FIG. 6B, and FIG. 6C, each blender outlet 13A/13B/13C can be fluidly connected to the common slurry mixing tub 10 and an independent dilution injection port 12A/12B/12C (or BV1/BV2/BV3). The dilution injection port meters dilution fluid into the concentrated proppant slurry stream in concentrated slurry line 11A/11B/11C, in the depicted embodiment of FIG. 6A-FIG. 6C. This allows the blender outlet 13A/13B/13Cto deliver any proppant (e.g., sand) concentration below the high or "concentrated" proppant concentration mixed in and provided by the slurry mixing tub 10. The dilution injection port 12/14 can include a metering device 12A'/12B'/12C' (e.g., a metering valve 12A'/12B'/12C' such as a butterfly valve) and a flowmeter for measuring the amount of dilution fluid (e.g., water) delivered. A flowmeter for each blender outlet line 13A/13B/13C can also be included for measuring either the amount of slurry fluid provided by the mixing tub 10 or for the total of the diluted fluid composition 25 (e.g., slurry fluid from the mixing tub 10 and dilution fluid introduced the dilution injection port). The dilution fluid can be delivered at a set ratio to either the concentrated proppant slurry provided from the mixing tub 10 (e.g., by upstream injection ports 12/BV) or the slurry fluid exiting the discharge pump 20 (e.g., via downstream injection ports 14. In embodiments, the metering device 12A'/12B'/12C' of the injection port 12/14 (e.g., upstream injection port 12A/12B/12C, downstream injection port 14A/14B/14C) can be or include a metering pump, such as, and without limitation, a positive displacement pump, piston pump, plunger pump, gear pump, progressive cavity pump, circumferential piston pump. In embodiments, using a metering pump could eliminate the need for the flowmeter in the injection port. In embodiments, the bypass valve BV can serve as metering valve, if the bypass valve is proportionally controlled. In such embodiments, the bypass valve BV position can be controlled to throttle flow of non-slurry fluid 17 (or fluids 17, when multiple fluids 17 are utilized).

The blender I/II/III/IV/V can be equipped with a control system 30 connected to the flowmeters and the metering valve such that the control system 30 can take an input of desired proppant (e.g., sand) concentration for each blender outlet line 13 and control the metering valve to deliver that desired proppant concentration. This control loop can also depend on the concentration of concentrated slurry 11 mixed in the slurry mixing tub 10; the concentration of proppant in the tub (e.g., the "concentrated proppant concentration") must be as high or higher than the concentration desired in the composition 25 provided by any one of the blender outlet lines 13.

As discussed hereinabove with reference to FIG. 2A, FIG. 2B, and FIG. 2C, and shown in FIG. 6A, FIG. 6B, and FIG. 6C, tub bypass valves BV can be utilized to provide fluid at the inlet of each discharge pump 20. Alternatively or additionally, the BV can be located downstream of the discharge pumps 20. in which case, when BV is opened and CPV is closed, the clean fluid source pump can be the pump providing boost pressure to the high pressure pumps (e.g., pumps 122 of FIG. 7 to FIG. 9). The tub bypass arrangement associated with each of the plurality of discharge pumps 20 can comprise two valves; one, a bypass valve BV, controlling the supply of a fluid 17 substantially free of proppant and one, a concentrated proppant valve CPV, controlling the supply of concentrated slurry fluid 11 to the discharge pump 20 via concentrated slurry inlet lines 11. In normal operation the substantially proppant-free fluid supply valve or bypass valve BV can remain closed and the concentrated slurry fluid valve CPV can remain open, so that proppant slurry is provided for the blender outlet lines 13. If there is a desire to stop all proppant concentration to a blender outlet 13, the bypass valve arrangement can be switched so that the associated substantially proppant-free fluid valve or "bypass valve" BV is open and the concentrated proppant valve CPV is closed. In this way the proppant concentration to a blender outlet line 13 can be reduced to zero (e.g., lb/gal) while the other blender outlets 13 can continue to deliver composition(s) 25 comprising proppant laden fluid.

Using this tub bypass arrangement when supplying fluid to more than one well has advantages over using tub bypass on a convention blender with a single outlet. With a conventional blender and single well, any time the blender goes to tub bypass to abort proppant quickly, proppant is left in the tub and must be disposed of after the end of the treatment. With the blending unit I/II/III/IV/V of this disclosure, as long as at least one discharge pump 20 continues to pump fluid from the tub 10, the proppant in the tub 10 can fully clean out while pumping to the connected well 130.

The substantially proppant-free fluid supply bypass valve BV of the tub bypass valve arrangement can also serve as the metering valve for the dilution injection ports 12/14.

As noted hereinabove, the substantially proppant-free fluid supply to the bypass valve arrangement may be connected to a substantially proppant-free fluid supply pump 15. This substantially proppant-free fluid supply pump 15 may also be the suction pump that also supplies fluid to the slurry mixing tub 10, in embodiments. In embodiments, the blending unit I/II/III/IV/V may be equipped with two substantially proppant-free fluid supply pumps 15. The use of two pumps 15 can allow for redundancy if one pump 15 fails, and can also provide higher pumping rates of substantially proppant-free fluid than may be obtained using a single pump 15. Both pumps 15 may be plumbed to both the mixing tub 10 and the tub bypass valve arrangement; allowing one pump 15 to supply the mixing tub 10 while the other pump 15 supplies the tub bypass valve arrangement.

As noted hereinabove with reference to the blending unit III of FIG. 3A and FIG. 3B, there may be a crossover line 26 at the blender outlet lines 13. The crossover line(s) 26 can include crossover valves CV that isolate the (e.g., three) blender outlet lines 13 when closed or can selectively connect the blender outlet lines 13 when open. In such embodiments, the blender I/II/III/IV/V can use one discharge pump 20 and dilution injection metering system as a backup whenever the blender I/II/III/IV/V is supplying fluid to a number of wells 130 less than the number of discharge pumps (e.g., only two wells with three discharge pumps 20). As noted above with reference to FIG. 3A, if blender outlet lines 13A and 13C are being used, the discharge pump 20B and dilution injection port 12B/14B or BV2 can be in reserve as backup. If backup is needed, discharge pump 20B can be activated and one of the crossover valves CV in the crossover line 26 opened so that the discharge pump 20B can be connected to either blender outlet line 13A or blender outlet line 13C.

As seen in FIG. 6, a crossover line 26' can that connect a passenger side discharge header 47A to a driver side discharge header 47B. This can allow for outlet lines 13A/13B/13C (and outlets 13A'/13B'/13C' thereof) to be on the passenger side and an alternate set of outlet lines 13A/13B/13C (and outlets 13A'/13B'/13C' thereof) to be located on the driver side. With this configuration, blender discharge hoses can be rigged up on either side of the blending unit I, II, III, IV, V.

As depicted in FIG. 1, a pump 6 can be located downstream of the slurry mixing tub 10 but upstream of where the piping (e.g., concentrated proppant line 11) branches to each of the discharge pumps 20. This pump 6 can be of a type that requires low net positive suction head and can aid in pushing the fluid to the inlets 3A/3B/3C of the discharge pumps 20, thus overcoming the increased pressure loss from the additional piping on the disclosed blending unit relative to a conventional single well blender comprising a single discharge pump 20.

In embodiments, as mentioned hereinabove, the herein disclosed blending unit I/II/III/IV/V can be operated in single well split flow mode. In this mode the blender I/II/III/IV/V can supply a clean fluid composition 25 (e.g., comprising no added proppant) from one blender outlet line 13 and a slurry fluid composition 25 from a second blender outlet line 13. The bypass valve BV to the clean fluid supply 17 can be open for the blender outlet line 13 supplying clean fluid composition 25. In such embodiments, a third discharge pump, if present, can serve as a backup for both the clean and slurry fluid discharge pumps 20 by using the crossover valves CV and crossover line(s) 26, as described hereinabove with reference to the embodiment of FIG. 3A and FIG. 3B.

In embodiments, the blending unit I, II, III, IV, V can include four discharge pumps 20. In this configuration, the blending unit can provide all fluid streams needed for a split flow simultaneous fracturing job on two wellbores 130. For such embodiments, all four of the discharge pumps 20 can be utilized (e.g., two of the four discharge pumps 20 for pumping clean fluid 17 and the other two of the four discharge pumps 20 pumping dirty fluid (e.g., proppant slurry 11)). Zero, one or more additional discharge pumps 20 can be included to be available for backup.

With reference to FIG. 1, a blending unit of this disclosure can further comprise liquid additive metering pump(s) 8 for supplying additives for modifying the fluid composition 25. The additive may be injected either upstream of where the fluid splits to the plurality (e.g., three) discharge pumps 20 (e.g., into common proppant supply 11) or downstream of the discharge pump(s) 20 (e.g., into blender outlet line(s) 13. The upstream injection ports 12, downstream injection ports 14, or additional injection ports (not shown) can be utilized for introduction of the liquid additives. If injected downstream, the additives supplied and the concentration for each additive can be customized for each of the (e.g., three) blender outlets 13.

Figure 7:
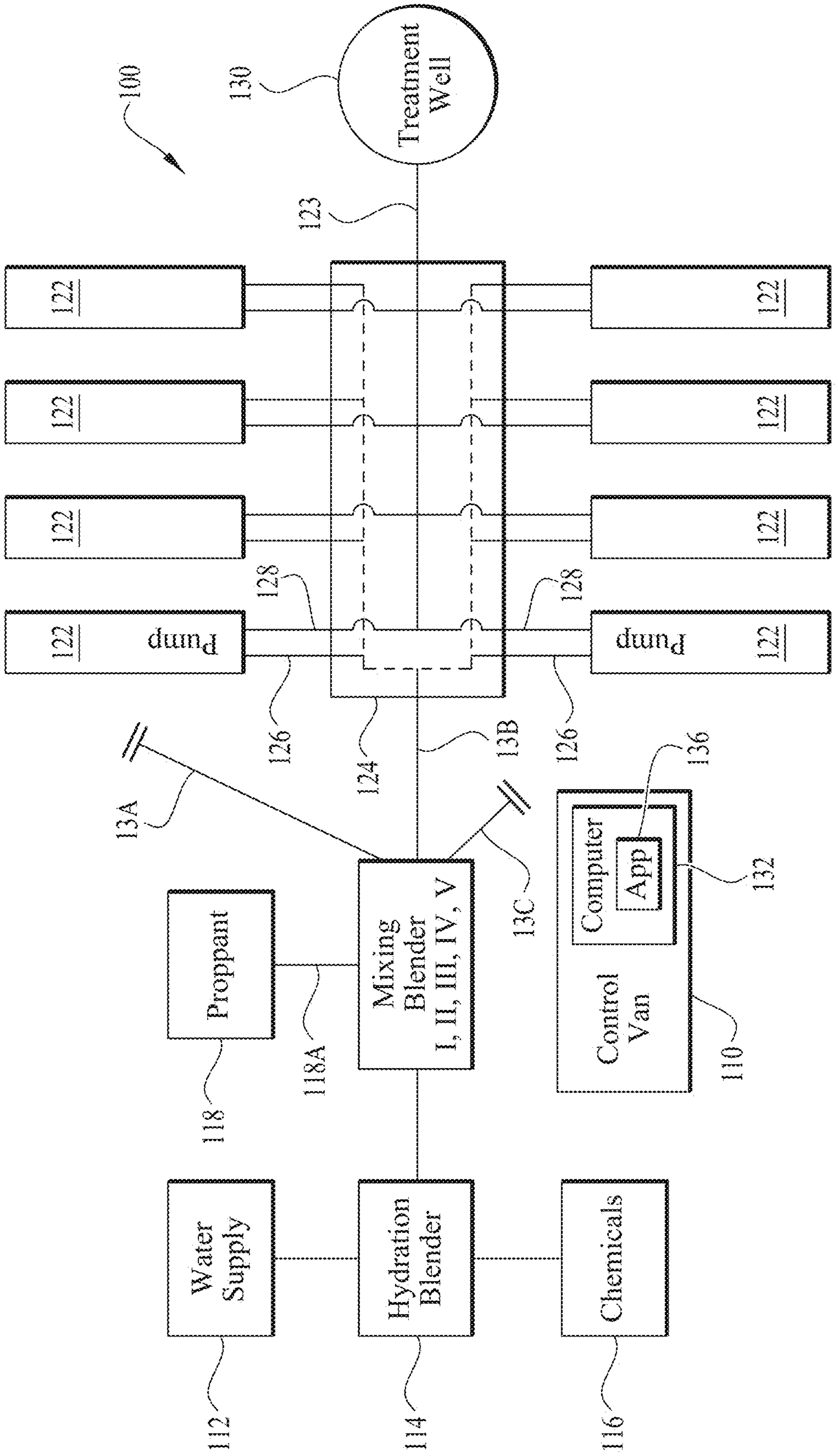
FIG. 7 is a block diagram of a hydraulic fracturing system treating one well, the hydraulic fracturing system comprising a blending unit according to embodiments of the disclosure.
Figure 8:
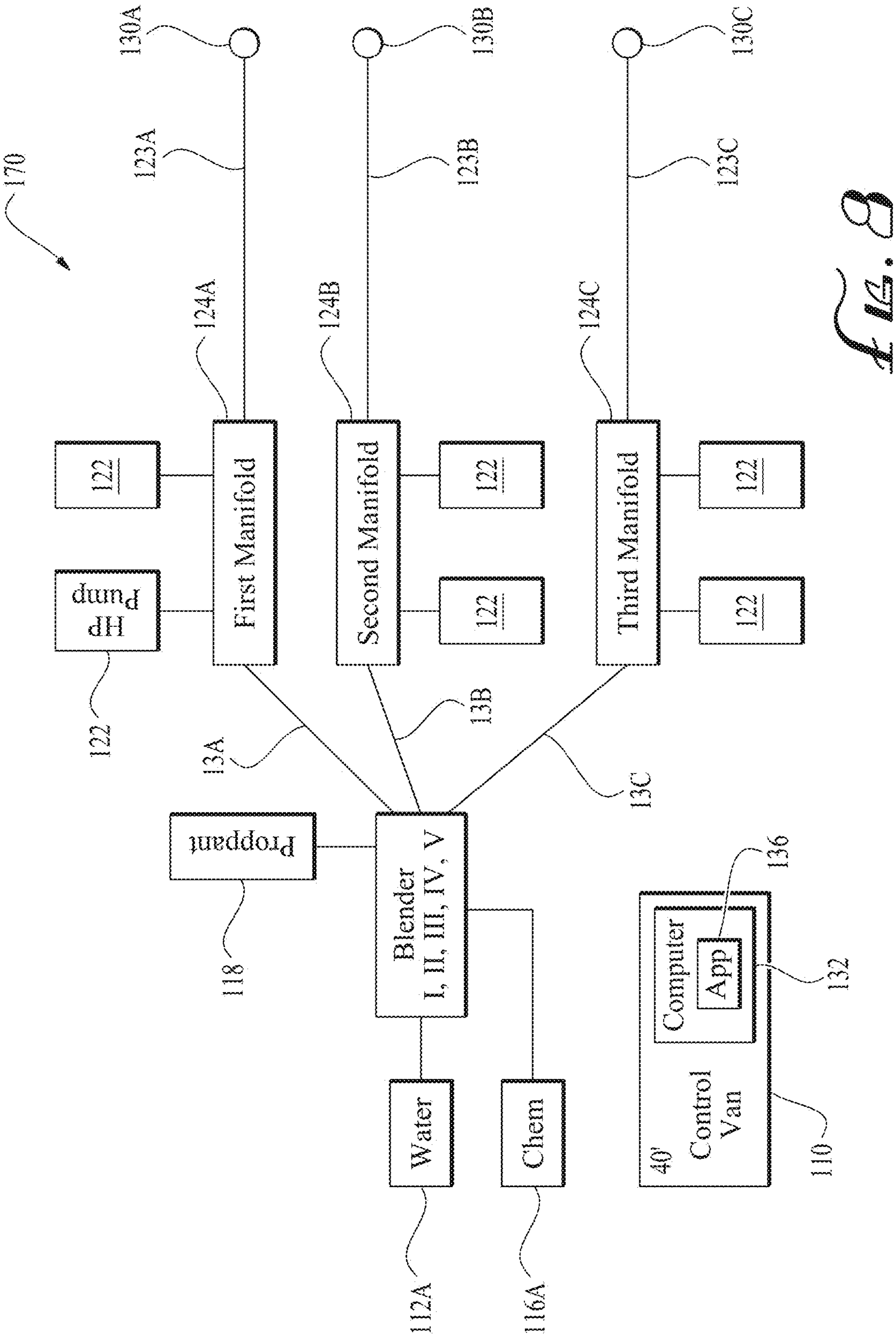
FIG. 8 is a block diagram of a hydraulic fracturing system treating three wells, the hydraulic fracturing system comprising a blending unit according to embodiments of the disclosure.
Figure 9:
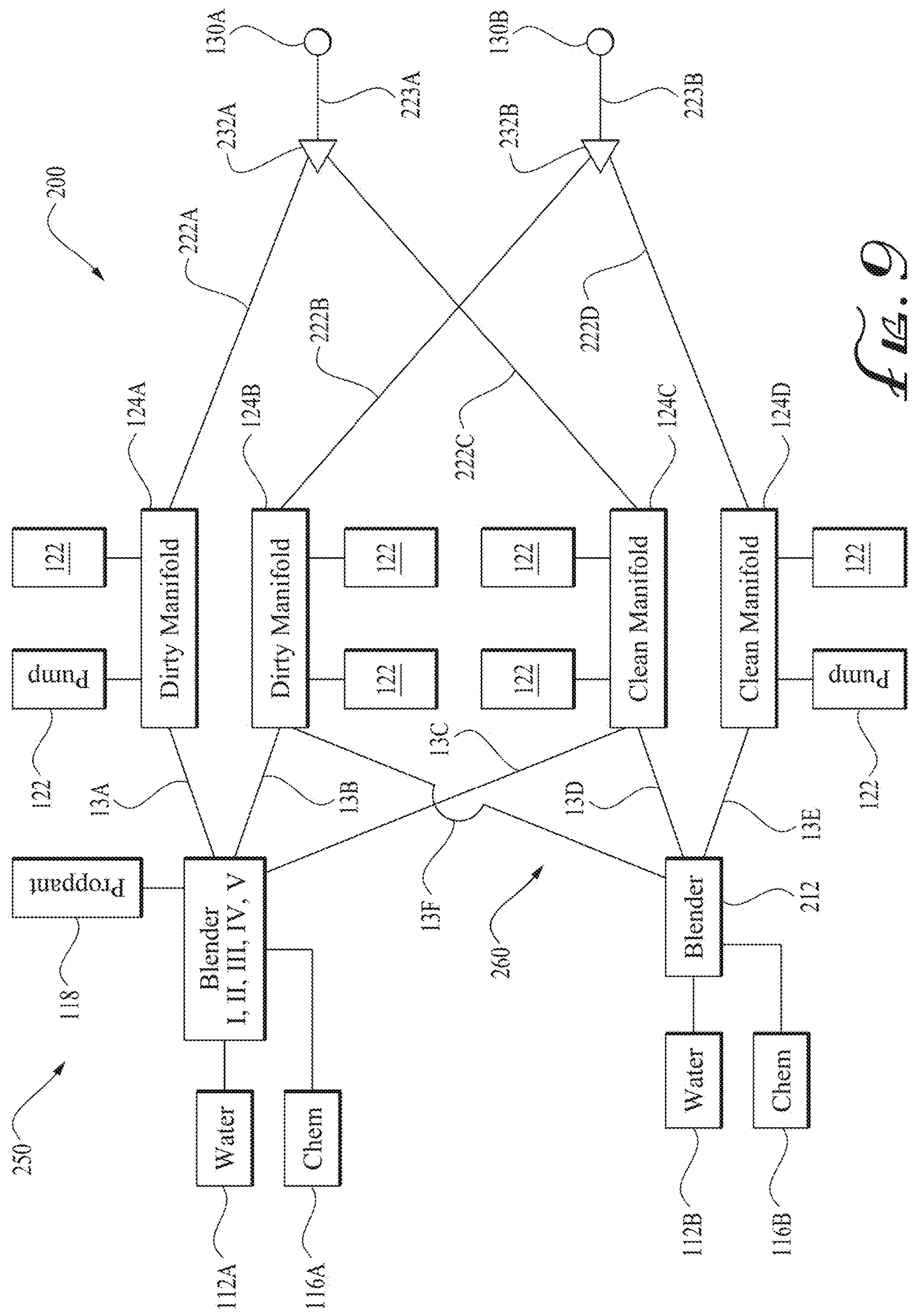
FIG. 9 is a block diagram of a hydraulic fracturing system treating two wells with two pumping groups, the hydraulic fracturing system comprising a blending unit according to embodiments of the disclosure.

As detailed further herein with reference to FIG. 7, FIG. 8, and FIG. 9, the blending unit I/II/III/IV/V of this disclosure can be utilized for simultaneous fracturing a plurality of wells 130. In embodiments, the blending unit I/II/III/IV/V of this disclosure can be utilized for simultaneous fracturing of a plurality of wells 130 using the split flow method. In some such embodiments, the multiple (e.g., three) blender outlet lines 13 can supply slurry fluid (e.g., via a dirty manifold or missile) to multiple (e.g., three) banks of dirty fluid frac pumps, each connected to a different well head of a well 130. A clean fluid supply can also be connected (e.g., via a clean manifold or missile) to multiple (e.g., 3) banks of clean fluid frac pumps, each connected to the multiple (e.g., three) wellheads. In such embodiments, the wellhead proppant (e.g., sand) concentration will be a dilution of the proppant concentration delivered from each blender outlet line 13 by the clean fluid supplied by the bank of clean fluid frac pumps. This dilution can be controlled by a supervisory control system (e.g., control system 40' of FIG. 6, which can be the same as or different from controller 30) of the frac spread.

In this disclosure where the term “clean” fluid is used, it indicates a fluid that is substantially free of proppant. However, a clean fluid can comprise many different waters. For example, the water of a clean fluid can comprise a fresh water, produced water, flowback water, or other water source and may contain additives such as friction reducers, polymers, biocides, pH adjusters, breakers. The term clean is only used to denote that the fluid is substantially free of (e.g., added) proppant.

As noted previously, the downstream dilution injection ports 14 of the discharge pumps 20 in FIG. 4 can, in embodiments, be replaced by upstream injection ports positioned upstream of each discharge pump 20. If located upstream of the discharge pumps 20, the substantially proppant-free fluid valve or bypass valve BV of the bypass arrangement can be utilized as the metering device for the dilution fluid. There can, however, be an advantage to, in some embodiments, utilizing downstream dilution ports 14 downstream of the slurry discharge pumps 20. If the injection port is located downstream thereof, the discharge pump 20 does not have to be sized to handle the additional rate of pumping the dilution fluid 17 injected via the dilution port 14. Thus, placing the dilution port 14 downstream of the discharge pump 20 can increase a maximum total discharge rate of the blending unit I/II/III/IV/V. If the dilution fluid 17 is injected upstream of the discharge pump (e.g., via upstream injection ports 12 or bypass valves BV), the dilution fluid 17 can be injected into a lower pressure stream (e.g., in concentrated proppant inlet lines 11A/11B/11C) and thus the requisite pressure supplied at the injection port can be decreased relative to downstream injection (where the blender outlet lines can have a pressure of about 50, 60, 70, 80, 90, 100, 110, 120, 130, 140, 150, or more, psi, in embodiments).

Although the disclosed blending unit I/II/III/IV/V is described as having a slurry mixing tub 10, other types of mixers are envisioned and within the scope of this disclosure. For example, and without limitation, in embodiments, the mixer utilized to provide concentrated proppant slurry in common proppant line 11 can be a centrifugal style mixer, sometimes also referred to as a tubless blender or tubless mixer. In embodiments, the herein disclosed blending unit I/II/III/IV/V can comprise more than one mixer or mixing tub 10, although in embodiments only one mixing tub 10 is utilized.

The control system 30 described (and shown in FIGS. 1-4) as being on the blending unit could also be a supervisory control system (e.g., control system 40') for either the full fracturing system or some portion of the fracturing system (e.g., for all blending equipment for example). Thus, a controller 40' could be utilized/operable for controlling the proppant concentration at the blender outlets 4, and could also control the proppant concentrations at each wellhead/well 130. If the split flow method is used in the fracturing process, the proppant (e.g., sand) concentration delivered to the wellhead/well 130 can be lower than the proppant concentration of the composition 25 at the blender outlet line 13.

Reference will now be made to FIG. 7, which is a block diagram of a hydraulic fracturing system 100 treating one well 130, the hydraulic fracturing system 100 comprising a blending unit I, II, III, IV, or V according to embodiments of the disclosure, FIG. 8, which is a block diagram of a hydraulic fracturing system 170 treating three wells 130A/130B/130C, the hydraulic fracturing system comprising a blending unit I, II, II, IV, or V according to embodiments of the disclosure, and FIG. 9, which is a block diagram of a hydraulic fracturing system 200 treating two wells 130A/130B with two pumping groups, the hydraulic fracturing system 200 comprising at least one blending unit I, II, III, IV, or V according to embodiments of the disclosure.

In embodiments, the blender outlet line 13 of at least one of the at least two discharge pumps 20 can be fluidly connected with a first fracturing manifold 124 fluidly connected with a first set of (e.g., high pressure) fracturing pumps 122 configured to introduce a first fluid (e.g., a "dirty" fluid comprising proppant) 123 into a first well 130. The blender outlet line 13 of at least one other of the at least two discharge pumps 20 can be fluidly connected with a second fracturing manifold 124 fluidly connected with a second set of (e.g., high pressure) fracturing pumps 122 configured to introduce a second fluid (e.g., a second "dirty" fluid comprising proppant) 123 into a second (different) well 130. FIG. 7 depicts the blender outlet line 13B introducing fluid therein (e.g., composition 25B) into a manifold 124, wherein low pressure lines 126 introduce the fluid into the high pressure fracturing pumps 122, and high pressure fluid is returned via high pressure lines 128 to line 123 for introduction into the well 130 for treatment. A similar arrangement of manifold and frac pumps 122 can be associated with the blender outlet lines 13A and 13C, which, for clarity, are not duplicated in FIG. 7. FIG. 7 also shows water supply 112, hydration blender 114, and chemical supply 116 that can be utilized, in addition with proppant supply 118 to introduce water, chemicals, and proppant to the blender tub 10 of the blending unit I, II, III, IV, or V. The water 112 and chemicals can be combined in hydration blender 114 for introduction into the blending tub 10 of blending unit I, II, III, IV, or V, as needed. A proppant container or source 118 can be utilized to dump or otherwise introduce the proppant into the blending tub 10 or other mixer of blending unit I, II, III, IV, or V.

Frac pumps 122 can be high pressure (e.g., positive displacement) pumps, while discharge pumps 20 can be low pressure (e.g., centrifugal) pumps.

As noted hereinabove, the proppant concentration of the fluid 25B being introduced into the manifold 124 can be different from the proppant concentration of the fluid 25A and/or the fluid 25C being introduced into a different manifold 124. The common proppant supply 11 can be obtained from a single blender tub 10 fed by a single proppant feed 118A (e.g., from a single proppant container or source 118).

The hydraulic fracturing system 100 of FIG. 7 can be utilized to pump hydraulic fracturing fluids 123 into a wellbore 130, is illustrated. As depicted, a plurality of hydraulic fracturing pumps 122 (also referred to as "frac pump" or high horsepower pumps) can be connected in parallel to a fracturing manifold 124 (also referred to as a "missile") to provide fracturing fluids 123 to the treatment well 130 (also referred to as the wellhead). The fracturing fluids are typically a blend of friction reducer and water, e.g., slick water, and proppant. In some cases, a gelled fluid (e.g., water, a gelling agent, optionally a friction reducer, and/or other additives) may be created in a hydration blender 114 from the water supply unit 112 and gelling chemicals from the chemical unit 116. When slick water is used, the hydration blender 114 can be omitted. The proppant is added at a controlled rate to the gelled fluid in the blending unit I/II/III/IV/V. The blending unit I/II/III/IV/V is in fluid communication with the manifold 124 so that the fracturing treatment is pumped into the manifold 124 for distribution to the frac pumps 122, via (e.g., low pressure) supply line 126. The fracturing fluids are returned to the manifold 124 from the frac pumps 122, via high pressure line 128, to be pumped into the treatment well 130 that is in fluid communication with the manifold 124. Although fracturing fluids typically contain a proppant, a portion of the pumping sequence may include a fracturing fluid without proppant (sometimes referred to as a pad fluid or a flush fluid herein). Although fracturing fluids typically include a gelled fluid, the fracturing fluid may be blended without a gelling chemical. Alternatively, the fracturing fluids can be blended with an acid to produce an acid fracturing fluid, for example, pumped as part of a spearhead or acid stage that clears debris that may be present in the wellbore and/or fractures to help clear the way for fracturing fluid to access the fractures and surrounding formation.

A control van 110 can be communicatively coupled (e.g., via a wired or wireless network) to any of the frac units wherein the term "frac units" may refer to any of the plurality of frac pumps 122, a manifold 124, a blending unit I, II, III, IV, or V (which can include a proppant storage unit 118, a hydration blender 114, a water supply unit 112, and a chemical unit 116). The managing application 136 executing on a computer (e.g., server) 132 within the control van 110 can establish unit level control over the frac units communicated via the network. Unit level control can include sending instructions to the frac units and/or receiving equipment data from the frac units. For example, the managing application 136 within the control van 110 can establish a pump rate of 25 bpm with the plurality of frac pumps 122 while receiving pressure and rate of pump crank revolutions from sensors on the frac pumps 122. The control van 110 can thus comprise controller 30 described above for controlling operation of blending unit I, II, III, IV, or V.

Figure 10:
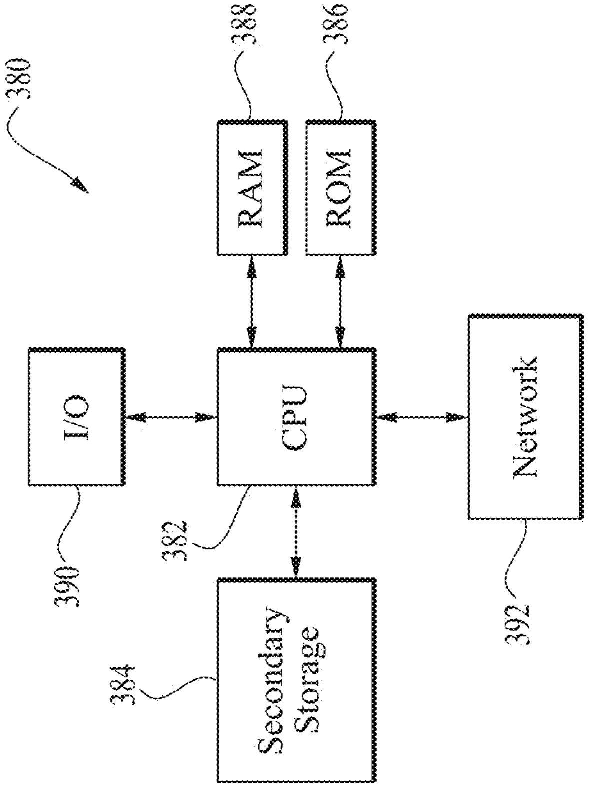
FIG. 10 is a block diagram of a computer system according to embodiments of the disclosure.

Although the managing application 136 is described as executing on a computer 132, it is understood that the computer 132 can be a computer system, for example computer system 380 in FIG. 10, or any form of a computer system such as a server, a workstation, a desktop computer, a laptop computer, a tablet computer, a smartphone, or any other type of computing device. The computer 132 (e.g., computer system) can include one or more processors, memory, input devices, and output devices, as described in more detail further hereinafter. Although the control van 110 is described as having the managing application 136 executing on a computer 132, it is understood that the control van 110 can have 2, 3, 4, or any number of computers 132 (e.g., computer systems) with 2, 3, 4, or any number of managing applications 136 executing on the computers 132.

The fracturing fleet can be divided into two pumping groups that share a blending unit I, II, III, IV, or V of this disclosure to simultaneously treat two (or more) wells. Turning now to FIG. 8, an embodiment of a hydraulic fracturing system 170 that can be utilized to pump hydraulic fracturing fluids 123 (e.g., 123A, 123B, 123C) into two or three wellbores 130 (e.g., with three wells 130A, 130B, 130C depicted in FIG. 8). As depicted, the capacity of the blending unit can be divided between two or three sets of frac pumps 122. A first set of frac pumps 122 can be connected to a first manifold 124A. A second set of frac pumps 122 can be connected to a second manifold 124B. As shown in FIG. 8, a third set of frac pumps 122 can be connected to a third manifold 124C, in embodiments. As previously described, the bending unit I/II/III/IV/V can produce a proppant slurry composition 25A/25B/25C in blender outlet lines 13A//13B/13C by adding proppant, e.g., sand, from the proppant storage unit 118 to slick water blended from water provided by the water supply 112A and a friction reducer from the chemical unit 116A. A first composition 25A (e.g., comprising proppant slurry or clean fluid, as detailed hereinabove) can be pumped via blender outlet line 13A to first the first manifold 124A and first set of frac pumps 122, composition 25B (e.g., comprising proppant slurry or clean fluid, as detailed hereinabove) can be pumped through blender outlet line 13B to first the second manifold 124B and second set of frac pumps 122, and optionally, a third composition 25C. e.g., comprising proppant slurry or clean fluid, as detailed hereinabove) can be pumped through blender outlet line 13C to third manifold 124C and third set of frac pumps 122. In embodiments, only one, two, four, or more manifolds can be fluidly connected with a blending unit I/II/III/IV/V of this disclosure.

Via the use of a blending unit I/II/III/IV/V of this disclosure, the total volumetric rate of slurry received from blender outlet lines 13 (e.g., and optionally received by the wellbores 130) can exceed the total volumetric rate output of the mixing tub 10, due to the dilution of the concentrated proppant in line 11 with dilution fluid as described hereinabove. As the volumetric rate output of the mixing tub 10 can be limited by the maximum proppant, e.g., sand, mixing in mixing tub 10, utilization of a blending unit I/II/III/IV/V as detailed herein can enable additional volumetric rate output with the use of a single mixing tub 10. A plurality of frac pumps 122 can be connected in parallel to the first manifold 124A. Likewise, a plurality of frac pumps 122 can be connected in parallel to the second manifold 124B. In embodiments, a plurality of frac pumps 122 can also be connected in parallel to a third manifold 124C. Although two frac pumps 122 are shown, it is understood that 1, 2, 4, 8, 16, or any number of frac pumps 122 can connect in parallel to first manifold 124A, second manifold 124B, and/or third manifold 124C.

A first wellbore 130A can receive a volume of fluid (e.g., proppant slurry having a first proppant concentration) from the first manifold 124A via high pressure line 123A. A second wellbore 130B can receive a volume of fluid (e.g., proppant slurry having a second proppant concentration) from the second manifold 124B via high pressure line 123B. In embodiments, a third wellbore 130C can receive a volume of fluid (e.g., proppant slurry having a third proppant concentration) from the third manifold 124C via high pressure line 123C. The first proppant concentration, the second proppant concentration, and the third proppant concentration can be the same or different.

A control van (e.g., control van 110 from FIG. 7) can be communicatively coupled (e.g., via a wired or wireless network) to all of the frac units, wherein the term "frac units" may refer to any of the plurality of frac pumps 122, a manifold (e.g., 124A/124B/124C), a blending unit I/II/III/IV/V (which can include a proppant storage unit 118, a water supply unit (e.g., 112A), and a chemical unit (e.g., 116A)). The managing application 136 executing on a computer (e.g., server) 132 within the control van 110 can establish unit level control over the frac units communicated via the network. Unit level control can include sending instructions to the frac units and/or receiving equipment data from the frac units.

To increase the pumping capacity of the available pumping equipment, the fracturing fleet can be divided into a clean pumping group and a dirty pumping group, in embodiments. Turning now to FIG. 9, an embodiment of a hydraulic fracturing system 200 that can be utilized to pump hydraulic fracturing fluids into two wellbores, is illustrated. As depicted, the pumping capacity of the fracturing fleet can be divided into a dirty fluid group 250 and a clean fluid group 260. The dirty fluid group 250 can comprise a blending unit I/II/III/IV/V of this disclosure utilized as a "dirty" blender connected to a first manifold 124A (e.g., to provide a composition 25A comprising proppant thereto) and a second manifold 124B (e.g., to provide a composition 25B comprising proppant thereto). As previously described, the blending unit I/II/III/IV/V can produce a multiple proppant slurry compositions 25 by adding proppant from the proppant storage unit 118 to a gelled fluid blended from water provided by the water supply 112A and gelling chemicals or friction reducers from the chemical unit 116A to produce concentrated proppant in line 11 which can be diluted via the addition of dilution fluid as described hereinabove to provide the composition 25 in each blender outlet line 13. The proppant slurry composition 25A, e.g., a dirty fluid, can be pumped through manifold feed line/blender outlet line 13A (or a line fluidly connected thereto) to first dirty manifold 124A and proppant slurry composition 25B, e.g., a dirty fluid, can be pumped through can manifold feed line/blender outlet line 13B to second dirty manifold 124B. A plurality of frac pumps 122 can be connected in parallel to first manifold 124A and second manifold 124B. The clean fluid group 260 can comprise a clean blender 212 (e.g., mixing blender) connected to a clean manifold 124C and a clean manifold 124D. In some cases, the clean blender 212 can be replaced with a boost pump, e.g., centrifugal pump, with chemical port to receive a chemical additive, such as a friction reducer. As previously described, the clean blender 212 can produce a slick water fluid blended from water provided by the water supply 112B and friction reducer chemicals from the chemical unit 116B. The slick water fluid, e.g., the clean fluid, can be pumped through feed line 13D to first clean manifold 124C, e.g., third manifold 124C, and feed line 13E to second clean manifold 124D, e.g., fourth manifold 124D. A plurality of frac pumps 122 can connect in parallel to third manifold 124C and fourth manifold 124D. In some embodiments, blender 212 can be a blending unit I/II/III/IV/V of this disclosure. In such embodiments, blender 212 can be utilized to provide a composition to dirty manifold 124A or 124B via blending unit 212 outlet line 13F. As shown, in embodiments, blending unit I/II/III/IV/V can provide clean fluid via blending outlet line 13C (for example, by closing concentrated proppant valve CPV on the common proppant line 11 and opening the bypass valve BV associated therewith) for use in manifold 124C or 124D, if needed.

A first wellbore 130A can receive a combined treatment volume (via line 223A) comprising a clean fluid volume and a dirty fluid volume from the clean fluid group 260 and the dirty fluid group 250, respectively. The dirty fluid group 250 can provide a dirty fluid volume via the first manifold 124A fluidly connected to a wye block 232A by high pressure line 222A. The clean fluid group 260 can provide a clean fluid volume via the first clean manifold 124C, e.g., third manifold 124C, fluidly connected to the wye block 232A by high pressure line 222C. High pressure connector 223A delivers the combined treatment volume from the wye block 232 to the first wellbore 130A. The wye block 232A can be a solid block, a manifold, a tubing branch, or any suitable high pressure connection.

A second wellbore 130B can receive a combined treatment volume (via line 223B) comprising a clean fluid volume and a dirty fluid volume from the clean fluid group 260 and the dirty fluid group 250, respectively. The dirty fluid group 250 can provide a dirty fluid volume via the second dirty manifold 124B fluidly connected to a wye block 232B by high pressure line 222B. The clean fluid group 260 can provide a clean fluid volume via the fourth manifold 124D fluidly connected to the wye block 232B by high pressure line 222D. High pressure connector 223B delivers the combined treatment volume from the wye block 232B to the second wellbore 130B. The wye block 232B can be a solid block, a manifold, a tubing branch, or any suitable high pressure connection.

Alternatively, a combination manifold can be used to combine the dirty fluid volume and clean fluid volume to a single output. A combination manifold comprises a clean low pressure side manifold, e.g., 124C and 124D, a dirty low pressure side manifold, e.g., 124A and 124B, and a unitary high pressure manifold that combines the fluid outputs of the pumps 122 to a single high pressure line fluidly connected to a wellbore (e.g., 130A and 130B).

A first combination manifold can comprise the clean low pressure side manifold 124C fluidly connected to a clean group of pumps 122 via supply line 126 and the dirty low pressure side manifold 124A fluidly connected to a dirty group of pumps 122 via supply line 126 (as shown in FIG. 7). The dirty low pressure side manifold 124A can be fluidly connected to the blending unit I/II/III/IV/V via supply line 13A. The clean low pressure side manifold 124C can be fluidly connected to the clean blender 212 via supply line 13D. The high pressure output from the clean group of pumps 122 and dirty group of pumps 122, connected to the combination manifold, can fluidly connect via high pressure line 128 (as shown in FIG. 7) to a unitary manifold output. The high pressure lines 222A and 222C can be replaced by high pressure line 223A connecting the combination manifold to the first wellbore 130A.

A second combination manifold can comprise the clean low pressure side manifold 124D fluidly connected to a clean group of pumps 122 via supply line 126 and the dirty low pressure side manifold 124B fluidly connected to a dirty group of pumps 122 via supply line 126 (as shown in FIG. 7). The dirty low pressure side manifold 124B can be fluidly connected to the dirty blender/blending unit I/II/III/IV/V from supply line 13B. The clean low pressure side manifold 124D can be fluidly connected to the clean blender 212 via supply line 13E. The high pressure output from the clean group of pumps 122 and dirty group of pumps 122, connected to the combination manifold, can fluidly connect via high pressure line 128 (as shown in FIG. 7) to a unitary manifold output. The high pressure lines 222B and 222D can be replaced by high pressure line 223B connecting the combination manifold to the second wellbore 130B.

A control van (e.g., control van 110 from FIG. 7) can be communicatively coupled (e.g., via a wired or wireless network) to any of the clean frac units or dirty frac units, wherein the term "frac units" may refer to any of the plurality of frac pumps 122, a manifold 124 (e.g., 124A, 124B, 124C, and 124D), a mixing blender 212 (e.g., which can, in embodiments, also comprise a blending unit I/II/III/IV/V) (which can include a proppant storage unit 118, a water supply unit (e.g., 112A/112B, which can be the same as or different from each other), and a chemical unit (e.g., 116A/116B)). The managing application 136 executing on a computer (e.g., server) 132 within the control van 110 can establish unit level control over the frac units communicated via the network. Unit level control can include sending instructions to the frac units and/or receiving equipment data from the frac units.

In embodiments, a method of this disclosure comprises: using the blending unit I/II/III/IV/V of this disclosure to produce a first blender outlet composition 25A from the blender outlet line 13A fluidly connected with the discharge outlet 4A of one 20A of the at least two discharge pumps 20, and a second blender outlet composition 25B from the blender outlet line 13B fluidly connected with the discharge outlet 4B of another 20B of the at least two discharge pumps 20, wherein the first blender outlet composition 25A has a first proppant concentration and the second blender outlet composition 25B has a second proppant concentration, and wherein the first proppant concentration and the second proppant concentration are the same or different. The method can further comprise utilizing the first blender outlet composition 25A in a wellbore treatment of a first well 130A and utilizing the second blender composition 25B in a wellbore treatment of a second well 130B, wherein the first well 130A and the second well 130B are different wells. The wellbore treatment of the first well 130A and the wellbore treatment of the second well 130B can comprise hydraulic fracturing. In embodiments, the blending unit can be operated such that the first and second proppant concentrations are the same; one or the other concentration may only be changed to be a different concentration if there is an unexpected issue while treating the well (e.g., the treating pressure is higher than expected and the proppant concentration on that well has to be reduced to reduce the treating pressure).

In embodiments, each of the two or more discharge pumps 20 further comprises a concentrated proppant valve CPV on the concentrated proppant inlet line 11, and the injection port of each of the two or more discharge pumps 20 comprises a bypass valve BV configured to introduce the substantially proppant-free fluid 17 to the concentrated proppant inlet line 11A/11B/11C of the each of the two or more discharge pumps 20 downstream of the concentrated proppant valve CV or into the blender outlet line 13, wherein substantially proppant-free fluid can be introduced via the injection port 12/14 of each of the two or more discharge pumps 20 by opening the bypass valve BV associated therewith. In embodiments, the method further comprises: producing a slurry comprising proppant as the first blender outlet composition 25A via a closed bypass valve BV1 and open concentrated proppant valve CPV1 on the concentrated slurry inlet line 11A associated with the one (e.g., discharge pump 20A) of the at least two discharge pumps 20; and producing a substantially-free proppant fluid as the second blender outlet composition 25B by opening the bypass valve BV2 and closing the concentrated proppant valve CPV2 on the concentrated slurry inlet line 11B associated with the another (e.g., discharge pump 20B) of the at least two discharge pumps 20. The first blender outlet composition 25A can be utilized for fracturing a first well 130, while simultaneously flushing a second well 130B with the second blender outlet composition 25B, in embodiments.

In embodiments, the blending unit comprises at least three discharge pumps 20, and further comprises a crossover line (or path) 26 fluidly connecting the discharge outlet 4 of each of the at least three discharge pumps 20 with the blender outlet line 13 of at least one other of the at least three discharge pumps 20, and a crossover valve CV on the crossover line 26, that can be opened or closed to permit or prevent fluid flow between the each of the three or more discharge pumps 20 and the blender outlet line 13 of the at least one other of the at least three discharge pumps 20. In such embodiments, the method can further comprise: utilizing one (e.g., discharge pump 20A) of the discharge pumps 20 to pump the first blender outlet composition 25A to a first well 130A; utilizing another (e.g., discharge pump 20B) of the discharge pumps 20 to pump the second blender outlet composition 25B to a second well 130B; and upon failure of the first discharge pump 20A or the second discharge pump 20B, utilizing a third (e.g., discharge pump 20C) of the at least three discharge pumps 20 as backup for the failed discharge pump (20A or 20B) by opening the crossover valve CV between the blender outlet line 13C of the third discharge pump 20C and the blender outlet line 13A or 13B of the failed discharge pump 20A or 20B, respectively.

In embodiments, the blending unit I/II/III/IV/V is operated in split flow mode such that the first blender outlet composition 25A comprises proppant slurry, and another of the discharge pumps 20 provides a substantially proppant-free fluid composition 25.

The method can further comprise introducing a first blender outlet composition 25A comprising the proppant slurry to a first (e.g., dirty) fracturing manifold 124 fluidly connected with a first set of (e.g., high pressure) fracturing pumps 122 configured to introduce a first fluid (e.g., a proppant slurry) comprising the first blender outlet composition 25A into a first well 130A, and introducing a second blender outlet composition 25B comprising substantially proppant-free fluid to the first fracturing manifold 124 (e.g., a clean side of a combination manifold) or to a second (e.g., clean or dirty) fracturing manifold 124 fluidly connected with a second set of (e.g., high pressure) fracturing pumps 122 configured to introduce a fluid (e.g., a clean or dirty fluid) into the first well 130A or a second (different) well 130B.

The method can further comprise feeding the first blender outlet composition 25A to a first fracturing manifold 124 fluidly connected with a first set of (e.g., high pressure) fracturing pumps 122 configured to introduce a first dirty fluid (e.g., comprising proppant) into a first well 130A, and introducing a second blender outlet composition 25B to a second fracturing manifold 124 fluidly connected with a second set of (e.g., high pressure) fracturing pumps 122 configured to introduce a dirty fluid (e.g., comprising proppant) into a second (different) well 130B.

In embodiments, a method of this disclosure comprises providing a concentrated proppant fluid supply comprising a concentrated concentration of a proppant, producing a first blender outlet composition 25 (e.g., 25A) via one of at least two discharge pumps 20 (e.g., 20A), and a second blender outlet composition 25 (e.g., 25B) via another of the at least two discharge pumps 20 (e.g., 20B), wherein the first blender outlet composition, the second blender outlet composition, or both comprise an amount of the concentrated proppant fluid supply, wherein the first blender outlet composition has a first proppant concentration and the second blender outlet composition has a second proppant concentration, and wherein the first proppant concentration and the second proppant concentration are the same or different, and wherein the first proppant concentration and the second proppant concentration are less than the concentrated concentration provided in the concentrated proppant fluid supply.

In embodiments, both the first blender outlet composition 25A and the second blender outlet composition 25B both comprise the concentrated proppant fluid supply. For example, producing the first blender outlet composition 25A can comprise combining the concentrated proppant fluid supply with a first stream of a substantially proppant-free fluid, and producing the second blender outlet composition 25B can comprise combining the concentrated proppant supply and second stream of the substantially proppant-free fluid. The method can further comprise utilizing the first blender outlet composition 25A to treat a first well 130A, and utilizing the second blender outlet composition 25B to treat a second well 130B. Alternatively, the first blender outlet composition 25A can comprise an amount of the concentrated proppant fluid supply, and the second blender outlet composition 25B can comprise substantially proppant-free fluid. Producing the first blender outlet composition 25A can comprise combining the amount of the concentrated proppant fluid supply with a first stream of a substantially proppant-free fluid. The method can further include utilizing the first blender outlet composition 25A comprising proppant to treat a first well, and utilizing the second blender outlet composition 25B which is substantially proppant-free to treat (e.g., flush) a second well.

As discussed hereinabove with reference to FIG. 7, FIG. 8, and FIG. 9, the method can further include introducing a first blender outlet composition 25 comprising proppant to a first fracturing manifold 124 fluidly connected with a first set of (e.g., high pressure) fracturing pumps 122 configured to introduce a first dirty fluid (e.g., comprising proppant) comprising the first blender outlet composition 25 into a first well 130A, and introducing a second blender outlet composition comprising substantially proppant-free fluid to the first fracturing manifold 124 or to a second fracturing manifold 124 fluidly connected with a second set of (e.g., high pressure) fracturing pumps 122 configured to introduce a clean fluid into a second (different) well 130B.

In embodiments, the blending unit I/II/III/IV/V being utilized comprises at least three discharge pumps 20, and, upon failure of the one of the at least three discharge pumps 20, a crossover valve CV between a third discharge pump of the at least three discharge pumps 20 can be opened such that the third discharge pump can operate as a backup for the failed one of the at least three discharge pumps 20.

In embodiments, a method of this disclosure comprises utilizing a single mixing tub (or other mixer) 10 to produce a concentrated proppant stream 11 comprising a concentrated concentration of a proppant; and utilizing each of two or more discharge pumps 20 to independently provide an outlet composition 25, wherein a proppant concentration of the outlet composition 25 of at least one of the at least two discharge pumps 20 is different from an outlet composition 25 of another of the at least two discharge pumps 20, wherein the outlet composition 25 of each of the at least two discharge pumps 20 comprises from zero to the concentrated composition of the proppant, and wherein at least one of the outlet compositions comprises proppant. Valving on an inlet line to or a discharge line from each of the at least two discharge pumps 20 can be utilized to enable introduction of the concentrated proppant stream, a substantially proppant-free fluid, or both into the outlet composition 25 provided each of the at least two discharge pumps 20.

A pumping schedule to simultaneously treat two or more wells can be created based on pumping equipment availability, and can be designed and controlled as known in the art, for example, as described in U.S. Pat. No. 11,506,032 entitled, "Method To Reduce Peak Treatment Constituents in Simultaneous Treatment of Multiple Wells," the disclosure of which is hereby incorporated herein for purposes not contrary to this disclosure.

The herein disclosed fluid blending unit/multi-well blending system can be utilized as or in conjunction with a fluid proportioner, such as described in U.S. patent application Ser. No. 18/632,633, entitled, "Slurry Proportioner System", which is being filed concurrently herewith and the disclosure of which is hereby incorporated herein in its entirety for purposes not contrary to this disclosure.

FIG. 10 illustrates a computer system 380 suitable for implementing one or more embodiments disclosed herein, for example implementing one or more computers, servers or the like as disclosed or used herein, including without limitation any aspect of the computing system associated with controller 30 or control van 110 (e.g., computer 132). The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the computer system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

The herein disclosed blending unit I/II/III/IV/V and methods enable the production of compositions having independent proppant (e.g., sand) concentrations for a plurality of wells 130 to be mixed simultaneously using a single blending unit with a single mix tub 10. This can serve to reduce a number of blending units required on location. It also simplifies the proppant delivery equipment feeding the blender, since all proppant for the blending unit I/II/III/IV/V can be received at a single point (e.g., into blending tub 10). This can reduce capital, footprint, and/or rig-up complexity.

In embodiments, a blending unit I/II/III/IV/V of this disclosure comprises two or more independent outlets 13, a common proppant laden fluid supply providing fluid to the outlets 13, a discharge pump 20 dedicated to each outlet and an injection port dedicated to each outlet 13, where the discharge pump 20 and the injection port are located between the proppant laden fluid supply and the blender outlet 13. Such a blending unit allows for simulfrac or trimulfrac with independent proppant concentrations to each well 130 while using a single slurry mixing tub 10.

In embodiments, such as described with reference to FIGS. 2A, 2B, and 2C, a method of using a blender equipped with a single mixing tub 10, multiple discharge pumps 20, and tub bypass valves BV to each discharge pump 20 can be utilized to flush a first well 130 while simultaneously providing proppant laden fluid to at least a second well 130. This can enable simulfrac with decoupled transition time from proppant laden fluid to flush fluid for each well 130.

In embodiments, such as described with reference to FIG. 3A and FIG. 3B, a blending unit I/II/III/IV/V of this disclosure can comprise (three or more) discharge pumps 20, with a common primary supply source providing proppant laden fluid and a secondary common supply source comprising a substantially proppant-free fluid, with associated piping and valving such that the fluid source to each discharge pump 20 can be independently selected, and the blender outlets 13. A crossover line 26 can be utilized to selectively connect a backup (e.g., a second) discharge pump to blender outlets of other discharge pumps (e.g., blender outlets of the first and third discharge pumps 20). Such an arrangement can enable one of the discharge pumps to serve as a backup, for example, as backup to both a slurry discharge pump and a clean discharge pump, when the blending unit is operated in split flow mode.

For example, in embodiments, such as described hereinabove with reference to FIG. 3A and FIG. 3B, the blending unit I/II/III/IV/V of this disclosure provides an installed backup pump when the blender I/II/III/IV/V is used for supplying dirty side fluid for a two well simulfrac or when supplying both dirty and clean side fluid for a single well split flow job. This can enable a reduction in blender attributable non-productive time (NPT) as compared to conventional blending equipment.

As detailed hereinabove, the herein disclosed blending unit I/II/III/IV/V and methods can enable simultaneous delivery of multiple slurry streams of different proppant concentrations via a single mix tub 10.

In embodiments, the herein disclosed blending unit I/II/III/IV/V can be utilized to supply proppant laden fluid to one (or more) discharge pump(s) 20 while simultaneously providing clean (e.g., substantially proppant-free) fluid to (or from) one or more of the other discharge pumps 20 while using only a single (e.g., one only) mixing tub 10 (that is without using a second mix tub). Conventional blenders utilize two tubs or mixers when mixing fluids for multiple (e.g., two) wells. Conventional prior art blenders typically have a single slurry discharge pump associated with each mixing tub, and can only deliver a slurry having a single proppant concentration, even if delivering the fluid to multiple wells.

The disclosed blending unit I/II/III/IV/V and methods enable dilution of a common, concentrated proppant (e.g., provided by mixing tub 10 via concentrated proppant line 11) with a dilution fluid on a low pressure side of fracturing pumps 122, rather than via combination on a high pressure side downstream of high pressure pumps 122. This can enable more efficient operation of the high pressure pumps 122.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Additional Disclosure

The following are non-limiting, specific embodiments in accordance with the present disclosure:

In a first embodiment, a blending unit comprises: two or more discharge pumps, each of the two or more discharge pumps having a suction inlet fluidly connected to a common proppant fluid supply via a concentrated proppant inlet line, and a discharge outlet fluidly connected to a blender outlet line; and an injection port upstream of the discharge pump and configured to inject substantially proppant-free fluid into the concentrated proppant inlet line, an injection port downstream from the discharge pump and configured to inject substantially proppant-free fluid into the blender outlet line, or both an injection port upstream of the discharge pump and an injection port downstream from the discharge pump.

A second embodiment can include the blending unit of the first embodiment, wherein a blender outlet line of a first of the two or more discharge pumps is fluidly connected with a first well and wherein a blender outlet line of a second of the two or more discharge pumps is fluidly connected with a second well, wherein the first well and the second well are different wells.

A third embodiment can include the blending unit of the first or second embodiment further comprising a control system operable to control operation of the blending unit to provide a slurry composition from each of the blender outlet lines, wherein the fluid composition provided via the blender outlet line of at least one of the two or more discharge pumps has a different proppant concentration than the slurry composition provided by the blender outlet line of at least one other of the two or more discharge pumps.

A fourth embodiment can include the blending unit of the any one of the first to third embodiment, wherein the common proppant fluid supply comprises a concentrated proppant slurry from a single mixer (e.g., mixing tub).

A fifth embodiment can include the blending unit of any one of the first to fourth embodiments, wherein the injection port of each of the two or more discharge pumps comprises a bypass valve configured to introduce the substantially proppant-free fluid to the concentrated proppant inlet line or the blender outlet line, whereby substantially proppant-free fluid can be introduced via the injection port of each of the two or more discharge pumps by opening the bypass valve associated therewith.

A sixth embodiment can include the blending unit of the fifth embodiment, wherein each of the two or more discharge pumps further comprises a concentrated proppant valve on the concentrated proppant inlet line, and operable to produce a proppant slurry comprising a proppant from the blender outlet line of at least one of the two or more discharge pumps and simultaneously produce a substantially proppant-free fluid from the blender outlet line of at least one other of the two or more discharge pumps by opening the bypass valve and closing the concentrated proppant valve associated with the at least one other of the at least two discharge pumps.

A seventh embodiment can include the blending unit of the fifth or sixth embodiment further comprising a crossover line (or flow path) fluidly connecting the discharge outlet of each of the two or more discharge pumps with the blender outlet line fluidly connected with at least one other of the at least two discharge pumps, and a crossover valve on the crossover line, wherein the crossover valve can be opened or closed to permit or prevent fluid flow between the each of the two or more discharge pumps and the blender outlet line of the at least one other of the at least two discharge pumps.

An eighth embodiment can include the blending unit of any one of the first to seventh embodiments, wherein the blending unit is configured on a trailer, a skid, multiple skids, or a combination thereof.

A ninth embodiment can include the blending unit of any one of the first to eighth embodiments, wherein the blender outlet line of at least one of the at least two discharge pumps is fluidly connected with a first fracturing manifold fluidly connected with a first set of (e.g., high pressure) fracturing pumps configured to introduce a first dirty fluid (e.g., comprising proppant) into a first well, and wherein the blender outlet line of at least one other of the at least two discharge pumps is fluidly connected with a second fracturing manifold fluidly connected with a second set of (e.g., high pressure) fracturing pumps configured to introduce a second dirty fluid (e.g., comprising proppant) into a second (e.g., different) well, wherein the first fracturing manifold and the second fracturing manifold are the same or different.

A tenth embodiment can include the blending unit of the ninth embodiment, wherein a proppant concentration of the first dirty fluid is different from a proppant concentration of the second dirty fluid.

An eleventh embodiment can include the blending unit of any one of the first to tenth embodiments, wherein the injection port associated with at least one of the two or more discharge pumps is downstream from the at least one of the two or more discharge pumps.

A twelfth embodiment can include the blending unit of any one of the first to eleventh embodiments, wherein the common proppant fluid supply comprises a single mixer fed by a single proppant feed (e.g., multiple metering devices (e.g., augers, belts, metering gates) contributing proppant at a metered rate into the tub or mixer from one or more storage systems (e.g., containers, exposed piles, silos, etc.).

A thirteenth embodiment can include the blending unit of any one of the first to twelfth embodiments, comprising four discharge pumps, wherein each of two of the four discharge pumps provides substantially proppant-free fluid to the blender outlet line fluidly connected thereto, and wherein each of the other two of the four discharge pumps provide proppant fluid to the blender outlet line fluidly connected thereto.

In a fourteenth embodiment, a method comprises: using the blending unit of any of the first to thirteenth embodiments to produce a first blender outlet composition from the blender outlet line fluidly connected with the discharge outlet of one of the at least two discharge pumps, and a second blender outlet composition from the blender outlet line fluidly connected with the discharge outlet of another of the at least two discharge pumps, wherein the first blender outlet composition has a first proppant concentration and the second blender outlet composition has a second proppant concentration, and wherein the first proppant concentration and the second proppant concentration are the same or different.

A fifteenth embodiment can include the method of the fourteenth embodiment further comprising utilizing the first blender outlet composition in a wellbore treatment of a first well and utilizing the second blender composition in a wellbore treatment of a second well, wherein the first well and the second well can be the same or different.

A sixteenth embodiment can include the method of the fifteenth embodiment, wherein the wellbore treatment of the first well and the wellbore treatment of the second well comprise hydraulic fracturing.

A seventeenth embodiment can include the method of any one of the fourteenth to sixteenth embodiments, wherein each of the two or more discharge pumps further comprises a concentrated proppant valve on the concentrated proppant inlet line, and wherein the injection port of each of the two or more discharge pumps comprises a bypass valve configured to introduce the substantially proppant-free fluid to the concentrated proppant inlet line of the each of the two or more discharge pumps downstream of the concentrated proppant valve or into the blender outlet line, wherein substantially proppant-free fluid can be introduced via the injection port of each of the two or more discharge pumps by opening the bypass valve associated therewith, wherein the method further comprises: producing a slurry comprising proppant as the first blender outlet composition via an open or closed bypass valve and an open concentrated proppant valve on the concentrated slurry inlet line associated with the one of the at least two discharge pumps; and producing a substantially-free proppant fluid as the second blender outlet composition by opening the bypass valve and closing the concentrated proppant valve on the concentrated slurry inlet line associated with the another of the at least two discharge pumps.

An eighteenth embodiment can include the method of the seventeenth embodiment further comprising utilizing the first blender outlet composition for fracturing a first well, while simultaneously flushing a second well with the second blender outlet composition.

A nineteenth embodiment can include the method of any one of the fourteenth to eighteenth embodiments, wherein the blending unit comprises at least three discharge pumps, and wherein the blending unit further comprises a crossover line (or flow path) fluidly connecting the discharge outlet of each of the at least three discharge pumps with the blender outlet line of at least one other of the at least three discharge pumps, and a crossover valve on the crossover line, that can be opened or closed to permit or prevent fluid flow between the each of the three or more discharge pumps and the blender outlet line of the at least one other of the at least three discharge pumps, and wherein the method further comprises: utilizing the one of the discharge pumps to pump the first blender outlet composition to a first well; utilizing the another of the discharge pumps to pump the second blender outlet composition to a second well; and upon failure of the first discharge pump or the second discharge pump, utilizing a third of the at least three discharge pumps as backup for the failed discharge pump by opening the crossover valve between the blender outlet line of the third discharge pump and the blender outlet line of the failed discharge pump.

A twentieth embodiment can include the method of the nineteenth embodiment, wherein the blending unit is operated in split flow mode such that the first blender outlet composition comprises proppant slurry, and the another of the discharge pumps provides a substantially proppant-free fluid.

A twenty first embodiment can include the method of the twentieth embodiment further comprising introducing the first blender outlet composition comprising the proppant slurry to a first (e.g., dirty) fracturing manifold fluidly connected with a first set of (e.g., high pressure) fracturing pumps configured to introduce a first dirty fluid (e.g., comprising proppant) comprising the first blender outlet composition into a first well, and introducing the second blender outlet composition comprising the substantially proppant-free fluid to the first fracturing manifold or to a second (e.g., clean or dirty) fracturing manifold fluidly connected with a second set of (e.g., high pressure) fracturing pumps configured to introduce a clean or dirty fluid into the first or a second (e.g., different) well.

A twenty second embodiment can include the method of any one of the fourteenth to twenty first embodiments further comprising feeding the first blender outlet composition to a first fracturing manifold fluidly connected with a first set of (e.g., high pressure) fracturing pumps configured to introduce a first dirty fluid (e.g., comprising proppant) into a first well, and introducing the second blender outlet composition to a second fracturing manifold fluidly connected with a second set of (e.g., high pressure) fracturing pumps configured to introduce a dirty fluid (e.g., comprising proppant) into a second (e.g., different) well.

In a twenty third embodiment, a method comprises: providing a concentrated proppant fluid supply comprising a concentrated concentration of a proppant; and producing a first blender outlet composition via one of at least two discharge pumps, and a second blender outlet composition via another of the at least two discharge pumps, wherein the first blender outlet composition, the second blender outlet composition, or both comprise an amount of the concentrated proppant fluid supply, wherein the first blender outlet composition has a first proppant concentration and the second blender outlet composition has a second proppant concentration, and wherein the first proppant concentration and the second proppant concentration are the same or different, and wherein the first proppant concentration and the second proppant concentration are less than the concentrated concentration.

A twenty fourth embodiment can include the method of the twenty third embodiment, wherein both the first blender outlet composition and the second blender outlet composition comprise the concentrated proppant fluid supply.

A twenty fifth embodiment can include the method of the twenty fourth embodiment, wherein producing the first blender outlet composition comprises combining the concentrated proppant fluid supply with a first stream of a substantially proppant-free fluid, and wherein producing the second blender outlet composition comprises combining the concentrated proppant supply and second stream of the substantially proppant-free fluid.

A twenty sixth embodiment can include the method of the twenty fourth or twenty fifth embodiment further comprising utilizing the first blender outlet composition to treat a first well, and utilizing the second blender outlet composition to treat a second well.

A twenty seventh embodiment can include the method of any one of the twenty third to twenty sixth embodiments, wherein the first blender outlet composition comprises an amount of the concentrated proppant fluid supply, wherein the second blender outlet composition comprises substantially proppant-free fluid, and wherein producing the first blender outlet composition comprises combining the amount of the concentrated proppant fluid supply with a first stream of a substantially proppant-free fluid.

A twenty eighth embodiment can include the method of the twenty seventh embodiment further comprising utilizing the first blender outlet composition to treat a first well, and utilizing the second blender outlet composition to treat (e.g., flush) a second well.

A twenty ninth embodiment can include the method of the twenty seventh embodiment or the twenty eighth embodiment further comprising introducing the first blender outlet composition comprising the proppant to a first fracturing manifold fluidly connected with a first set of (e.g., high pressure) fracturing pumps configured to introduce a first dirty fluid (e.g., comprising proppant) comprising the first blender outlet composition into a first well, and introducing the second blender outlet composition comprising the substantially proppant-free fluid to the first fracturing manifold or to a second fracturing manifold fluidly connected with a second set of (e.g., high pressure) fracturing pumps configured to introduce a clean fluid into a second (e.g., different) well.

A thirtieth embodiment can include the method of any one of the twenty third to twenty ninth embodiments, comprising at least three discharge pumps, and wherein, upon failure of the one or the another of the at least three discharge pumps, a crossover valve between a third discharge pump of the at least three discharge pumps is opened such that the third discharge pump can operate as a backup for the failed one or another of the at least three discharge pumps.

In a thirty first embodiment, a method comprises: utilizing a single mixer to produce a concentrated proppant stream comprising a concentrated concentration of a proppant; and utilizing each of two or more discharge pumps to independently provide an outlet composition, wherein a proppant concentration of the outlet composition of at least one of the at least two discharge pumps is different from an outlet composition of another of the at least two discharge pumps, wherein the outlet composition of each of the at least two discharge pumps comprises from zero to the concentrated composition of the proppant, and wherein at least one of the outlet compositions comprises proppant, wherein valving on an inlet line to or a discharge line from each of the at least two discharge pumps enables introduction of the concentrated proppant stream, a substantially proppant-free fluid, or both into the outlet composition provided each of the at least two discharge pumps.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as “optional,” both embodiments with this feature and embodiments without this feature are disclosed. Similarly, the present disclosure contemplates embodiments where this “optional” feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A blending unit comprising:

a first discharge pump downstream from a blender tub and having a suction inlet fluidly connected to the blender tub via a concentrated proppant inlet line, a discharge outlet fluidly connected to a blending unit outlet line, and (i) an injection port upstream of the first discharge pump and downstream from the blender tub and configured to inject substantially proppant-free fluid into the concentrated proppant inlet line, (ii) an injection port downstream from the first discharge pump and configured to inject substantially proppant-free fluid into the blending unit outlet line, or (iii) both the injection port upstream of the first discharge pump and downstream from the blender tub and the injection port downstream from the first discharge pump;

a first substantially proppant-free supply pump having a suction inlet fluidly connected to a substantially proppant-free fluid supply source and a discharge outlet fluidly connected to (i) the injection port upstream of the first discharge pump and downstream from the blender tub, (ii) the injection port downstream from the first discharge pump, or (iii) thereof; and a second substantially proppant-free supply pump having a suction inlet fluidly connected to the substantially proppant-free fluid supply source and a discharge outlet fluidly connected to (i) the injection port upstream of the first discharge pump and downstream from the blender tub, (ii) the injection port downstream from the first discharge pump, or (iii) a combination thereof.

2. The blending unit of claim 1, further comprising:

a second discharge pump downstream from the blender tub and having a suction inlet fluidly connected to the blender tub via a concentrated proppant inlet line, a discharge outlet fluidly connected to a blending unit outlet line, and (i) an injection port upstream of the second discharge pump downstream from the blender tub and configured to inject substantially proppant-free fluid into the concentrated proppant inlet line, (ii) an injection port downstream from the first discharge pump and configured to inject substantially proppant-free fluid into the blending unit outlet line, or (iii) both the injection port upstream of the second discharge pump and downstream from the blender tub and the injection port downstream from the second discharge pump.

3. The blending unit of claim 2, wherein the discharge outlet of the first substantially proppant-free supply pump is fluidly connected to (i) the injection port upstream of the second discharge pump and downstream from the blender tub, (iii) the injection port downstream from the second discharge pump, or (iii) both the injection port upstream of the second discharge pump and downstream from the blender tub and the injection port downstream from the second discharge pump.

4. The blending unit of claim 3, wherein the discharge outlet of the second substantially proppant-free supply pump is fluidly connected to (i) the injection port upstream of the second discharge pump and downstream from the blender tub, (iii) the injection port downstream from the second discharge pump, or (iii) both the injection port upstream of the second discharge pump and downstream from the blender tub and the injection port downstream from the second discharge pump.

5. The blending unit of claim 4, further comprising:

a third discharge pump downstream from the blender tub and having a suction inlet fluidly connected to the blender tub via a concentrated proppant inlet line, a discharge outlet fluidly connected to a blending unit outlet line, and (i) an injection port upstream of the third discharge pump and downstream from the blender tub and configured to inject substantially proppant-free fluid into the concentrated proppant inlet line, (ii) an injection port downstream from the third discharge pump and configured to inject substantially proppant-free fluid into the blending unit outlet line, or (iii) both the injection port upstream of the third discharge pump and downstream from the blender tub and the injection port downstream from the third discharge pump.

6. The blending unit of claim 5, wherein the discharge outlet of the first substantially proppant-free supply pump is fluidly connected to (i) the injection port upstream of the third discharge pump and downstream from the blender tub, (iii) the injection port downstream from the third discharge pump, or (iii) both the injection port upstream of the third discharge pump and downstream from the blender tub and the injection port downstream from the third discharge pump.

7. The blending unit of claim 5, wherein the discharge outlet of the second substantially proppant-free supply pump is fluidly connected to (i) the injection port upstream of the third discharge pump and downstream from the blender tub, (iii) the injection port downstream from the third discharge pump, or (iii) both the injection port upstream of the third discharge pump and downstream from the blender tub and the injection port downstream from the third discharge pump.

8. The blending unit of claim 5, further comprising a second crossover line fluidly connecting the discharge outlet of second discharge pump with the blending unit outlet line of the third discharge pump.

9. The blending unit of claim 8, further comprising a second crossover valve positioned on the second crossover line and configured to open to permit or close to prevent fluid flow between the second discharge pump and the blending unit outlet line of the third discharge pump.

10. The blending unit of claim 5, wherein the discharge outlet of the first substantially proppant-free supply pump is fluidly connected to (i) the injection port upstream of the first discharge pump and downstream from the blender tub, (ii) the injection port upstream from the second discharge pump and downstream from the blender tub, and (iii) the injection port upstream of the third discharge pump and downstream from the blender tub.

11. The blending unit of claim 10, wherein the discharge outlet of the second substantially proppant-free supply pump is further fluidly connected to the blender tub.

12. The blending unit of claim 10, wherein the discharge outlet of the second substantially proppant-free supply pump is fluidly connected to (i) the injection port upstream of the first discharge pump and downstream from the blender tub, (ii) the injection port upstream from the second discharge pump and downstream from the blender tub, and (iii) the injection port upstream of the third discharge pump and downstream from the blender tub.

13. The blending unit of claim 12, wherein the discharge outlet of the first substantially proppant-free supply pump is further fluidly connected to the blender tub and wherein the discharge outlet of the second substantially proppant-free supply pump is further fluidly connected to the blender tub.

14. The blending unit of claim 5, wherein the discharge outlet of the second substantially proppant-free supply pump is fluidly connected to (i) the injection port upstream of the first discharge pump and downstream from the blender tub, (ii) the injection port upstream from the second discharge pump and downstream from the blender tub, and (iii) the injection port upstream of the third discharge pump and downstream from the blender tub.

15. The blending unit of claim 14, wherein the discharge outlet of the first substantially proppant-free supply pump is further fluidly connected to the blender tub.

16. The blending unit of claim 5, wherein the discharge outlet of the first substantially proppant-free supply pump is fluidly connected to the blender tub and at least two of (i) the injection port upstream of the first discharge pump and downstream from the blender tub, (ii) the injection port upstream from the second discharge pump and downstream from the blender tub, or (iii) the injection port upstream of the third discharge pump and downstream from the blender tub.

17. The blending unit of claim 16, wherein the discharge outlet of the second substantially proppant-free supply pump is fluidly connected to the blender tub and at least two of (i) the injection port upstream of the first discharge pump and downstream from the blender tub, (ii) the injection port upstream from the second discharge pump and downstream from the blender tub, or (iii) the injection port upstream of the third discharge pump and downstream from the blender tub.

18. The blending unit of claim 2, further comprising a first crossover line fluidly connecting the discharge outlet of second discharge pump with the blending unit outlet line of the first discharge pump.

19. The blending unit of claim 18, further comprising a first crossover valve positioned on the first crossover line and configured to open to permit or close to prevent fluid flow between the second discharge pump and the blending unit outlet line of the first discharge pump.

20. The blending unit of claim 2, wherein the discharge outlet of the first substantially proppant-free supply pump is fluidly connected to the blender tub and at least one of (i) the injection port upstream of the first discharge pump and downstream from the blender tub or (ii) the injection port upstream from the second discharge pump and downstream from the blender tub.

21. The blending unit of claim 20, wherein the discharge outlet of the second substantially proppant-free supply pump is fluidly connected to the blender tub and at least one of (i) the injection port upstream of the first discharge pump and downstream from the blender tub or (ii) the injection port upstream from the second discharge pump and downstream from the blender tub.

22. The blending unit of claim 2, wherein the discharge outlet of the second substantially proppant-free supply pump is fluidly connected to the blender tub and at least one of (i) the injection port upstream of the first discharge pump and downstream from the blender tub or (ii) the injection port upstream from the second discharge pump and downstream from the blender tub.

23. The blending unit of claim 1, wherein the discharge outlet of the first substantially proppant-free supply pump is further fluidly connected to the blender tub and wherein the discharge outlet of the second substantially proppant-free supply pump is further fluidly connected to the blender tub.

* * * * *